(12) United States Patent
Harrington et al.

(10) Patent No.: US 7,077,208 B2
(45) Date of Patent: Jul. 18, 2006

(54) METHOD AND SYSTEM FOR DIRECTING FLUID FLOW

(75) Inventors: Michael J. Harrington, Bellevue, WA (US); Jeffery Dean Rabe, Renton, WA (US); David Alan Nickel, Enumclaw, WA (US)

(73) Assignee: R3 Pump Technologies, Bellevue, WA (US)

( * ) Notice: Subject to any disclaimer, the term of this patent is extended or adjusted under 35 U.S.C. 154(b) by 0 days.

(21) Appl. No.: 10/884,692

(22) Filed: Jul. 2, 2004

(65) Prior Publication Data

US 2005/0056431 A1    Mar. 17, 2005

Related U.S. Application Data

(63) Continuation-in-part of application No. 10/659,986, filed on Sep. 11, 2003.

(51) Int. Cl.
   *E21B 34/06* (2006.01)
(52) U.S. Cl. .................. 166/372; 166/370; 166/67; 405/128.25; 405/128.45; 210/220; 210/747; 210/760; 210/117; 210/205; 210/218; 210/221.2
(58) Field of Classification Search ........ 166/369–372, 166/371, 67, 313; 405/128.25, 128.45; 210/220, 210/747, 760, 117, 205, 218, 221.2; 422/28
   See application file for complete search history.

(56) References Cited

U.S. PATENT DOCUMENTS

| | | | | |
|---|---|---|---|---|
| 4,243,102 A | * | 1/1981 | Elfarr | 166/372 |
| 4,532,038 A | * | 7/1985 | Reid | 210/220 |
| 4,649,994 A | * | 3/1987 | Chaudot | 166/369 |
| 4,966,235 A | * | 10/1990 | Gregoli et al. | 166/371 |
| 5,095,975 A | * | 3/1992 | Bernhardt | 166/67 |
| 5,358,357 A | * | 10/1994 | Mancini et al. | 166/372 |
| 5,547,021 A | * | 8/1996 | Raden | 166/372 |
| 6,533,499 B1 | * | 3/2003 | Breeding | 405/128.25 |

* cited by examiner

*Primary Examiner*—David Bagnell
*Assistant Examiner*—Matthew J. Smith
(74) *Attorney, Agent, or Firm*—John S. Jardine

(57) ABSTRACT

An apparatus having various conduits moves liquid by passing gas up through it. A collector conduit transports the liquid to the bottom of the unit. A gas-lift conduit mixes the liquid and gas at the bottom and transports the mixture upwards, owing to the rising action of the bubbles and the resulting decreased density of the gas/liquid mixture. At the top of the gas-lift conduit, some of the gas may escape from the liquid and out of the apparatus. The lifted liquid may exit the apparatus at an elevation higher than the entry point of the liquid or may be directed down through a down and out conduit. A one way valve or equivalent configuration may be used to limit flow to one direction.

37 Claims, 22 Drawing Sheets

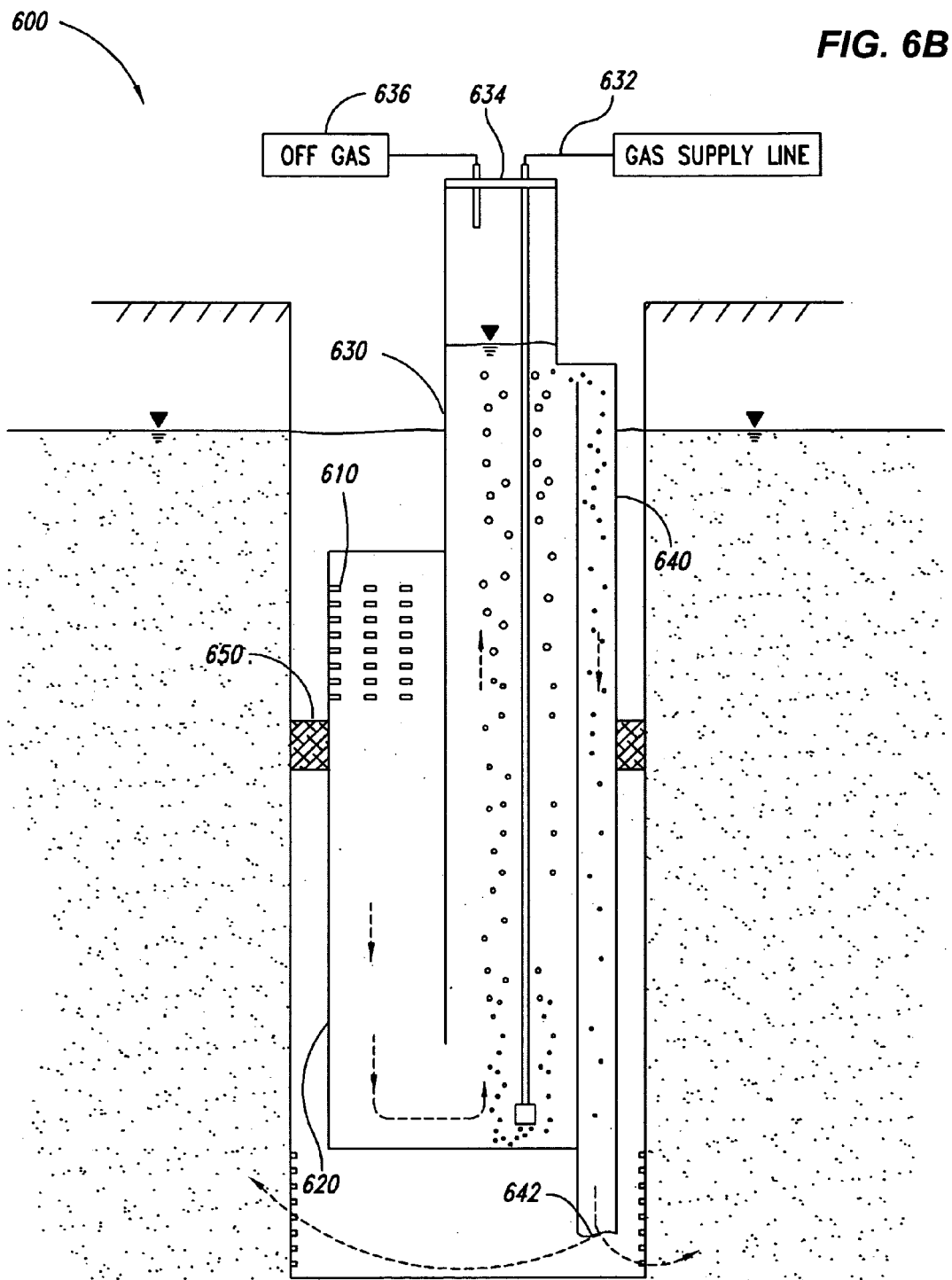

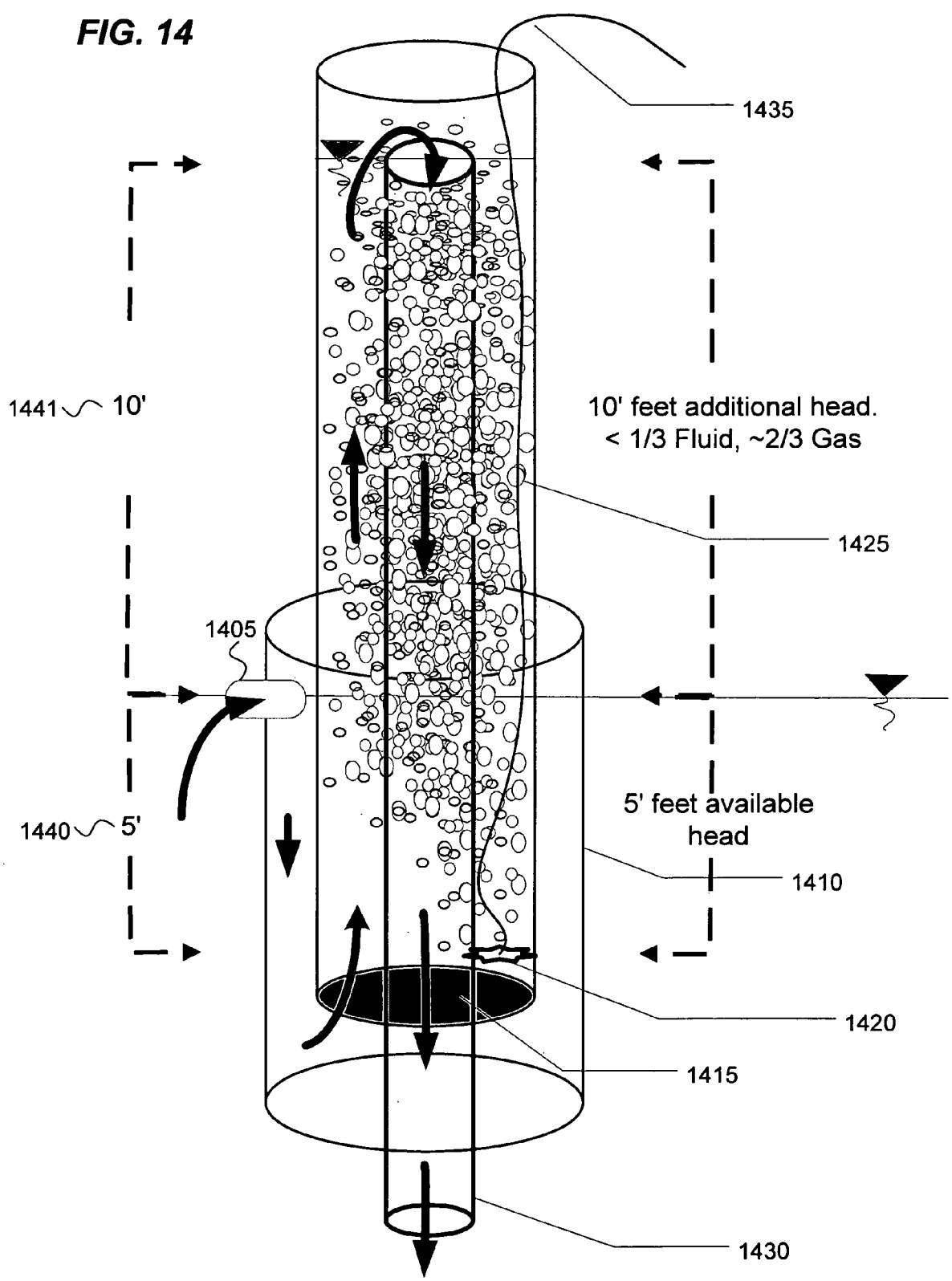

PLUME EATER CONSTRUCTION

METHOD AND SYSTEM FOR DIRECTING FLUID FLOW

CROSS REFERENCE TO RELATED APPLICATION

This application is a continuation-in-part of U.S. patent application Ser. No. 10/659,986, filed Sep. 11, 2003, now pending, which application is incorporated herein by reference in its entirety

FIELD OF THE INVENTION

The present invention relates generally to methods and systems for generating and directing fluid flow, and more particularly, to methods and systems that employ a gas to direct fluid flow.

BACKGROUND

Contaminated groundwater has become an increasingly common problem facing industry, the government, and the general public. Leaks from below-ground storage tanks, above-ground storage facilities, surface discharges, and other sources contaminate groundwater and soil, posing a variety of problems to the general public as well as the environment. The most common types of contaminants are volatile organic compounds (VOCs) which are pollutants of petroleum based products and chlorinated solvents. Regulatory mandates have demanded assessment and remediation of the contamination; however, efficient and cost-effective solutions for containment and remediation are still needed.

Previously, contaminated groundwater was pumped to above-ground facilities, treated, and returned to the phreatic zone. These "pump-and-treat" or above-ground methods are expensive and generally treated the groundwater only. The pump-and-treat method does not provide treatment to the soil in the vadose zone.

Various in situ systems have been attempted, including air sparging, blast-enhanced fracturing, directional wells, in situ vacuum, groundwater recirculation wells, hydraulic and pneumatic fracturing, in situ flushing or injection/recirculation, in situ stabilization/solidification, permeable reactive barriers, and thermal enhancements. Various in situ biological treatments have included bioslurping, intrinsic bioremediation, monitoring natural attenuation, and phytoremediation. Additionally, various electrokinetic and electrolysis systems have been attempted. Each of these solutions has a variety of drawbacks, including the expense to implement and maintain the system, the level of effectiveness, and the potential for making the contamination worse.

For example, air sparging has been used to reduce concentrations of volatile organic compounds (VOCs) found in petroleum products. Air sparging is generally more applicable to the lighter gasoline constituents because they readily transfer from the dissolved to the gaseous phase. Appropriate use of air sparging may require that it be combined with other removal methods. Air sparging should not be used if the following site conditions exist: free product is present; near subsurface confined spaces; highly impermeable soils, nor when contaminated groundwater is located in a confined aquifer system.

If free product is present, due to the flow pattern created, air sparging can create groundwater mounding which could potentially cause free product to migrate radially away from the air sparge well; expanding the plume. When nearby basements, sewers, or other subsurface confined spaces are present at the site, air sparging should also not be used. Potentially dangerous constituent concentrations could accumulate in basements and other depressions unless a vapor extraction system is used to control vapor migration. When contaminated groundwater is located in the confined aquifer system, air sparging should also not be used. Air sparging cannot be used to treat groundwater in a confined aquifer because the injected air would be trapped by the saturated confine layer and could not escape to the unsaturated zone.

The effectiveness of air sparging depends primarily on two factors:

1. Vapor/dissolved phase partitioning of the constituents determines the equilibrium distribution of a constituent between the dissolved phase and the vapor phase. Vapor/dissolved phase partitioning is, therefore, a significant factor in determining the rate at which dissolved constituents can be transferred to the vapor phase.

2. Permeability of the soil determines the rate at which air can be injected into the saturated zone. It is the other significant factor in determining the mass transfer rate of the constituents from the dissolved phase to the vapor phase.

Stratified or highly variable heterogeneous soils typically create the greatest barriers to air sparging. Both the injected air and the stripped vapors will travel along the paths of least resistance (coarse-grained zones) and could travel a great lateral distance from the injection point. This phenomenon could result in the contaminant-laden sparge vapors migrating outside the vapor extraction control area.

U.S. Pat. No. 6,210,073 issued to Buehlman, et al. (Buehlman) attempts to provide a solution for highly stratified soil by implementing multi-level fluid transfer systems, or individual air-sparging supply lines for each stratification of soil. This process not only incurs multiple system costs, but also requires additional cost to accurately map the stratification. Error with respect to mapping the stratification results in an ineffective system, or worse, a remediation system that spreads the plume of contamination.

Prior art FIG. 1 illustrates an in-well vapor stripping process 100. This process creates a groundwater circulation pattern A. An air injection blower 110 injects air into an air injection line 120. The air exits the air injection line 120 below the water table percolating up through the well. A packer 130 forces the air-stripped water out through the upper recharge screen 140. The contaminated air 150 is collected through a vacuum extraction blower 160 and treated.

Limitations reported for this technology include limited effectiveness in shallow aquifers, possible clogging of the well due to precipitation and the potential to spread the contaminant plume if the system is not properly designed or constructed.

This technology pulls the groundwater up and beneficially increases the level of dissolved oxygen as it does so. However, the water is released at the top of the groundwater, and the bottom of the vadose zone; the region which already has the highest levels of dissolved oxygen.

The convection current generated acts to push the contaminate plume away from the well. Perhaps this final limitation is the most significant and fatal flaw. Spreading the contaminant plume in an already contaminated region is harmful to groundwater remediation, as it pushes contaminants even further from a contaminated region.

Accordingly, there is a need to address the limitations associated with air sparging and the other available in situ remediation techniques and to provide an effective, cost-efficient method and system for in situ remediation of contaminated groundwater and soil.

SUMMARY

The present invention is directed to addressing the problems above and others. Briefly, the present invention's fluid flow system consists of a gas/liquid pump, which acts to move liquid by passing gas up through it. This pumping is accomplished by the liquid's moving through three conduits. The first, a collector conduit, transports the liquid to the bottom of the unit. The second, a gas-lift conduit, mixes the liquid and gas at the bottom and transports the mixture upwards, owing to the rising action of the bubbles and the resulting decreased density of the gas/liquid mixture. At the top of the gas-lift conduit, some of the gas escapes from the liquid and out of the unit. The lifted liquid then returns to near its original density and exits the unit through the third conduit, a down and out conduit.

Advantages of the present invention will become apparent from the following detailed description when taken in conjunction with the drawings, in which:

BRIEF DESCRIPTION OF THE DRAWINGS

FIG. 6B illustrates an embodiment of a fluid flow remediation system in which the conduits are adjacent;

FIG. 14 illustrates another apparatus in which the present invention may be practiced, in accordance with various aspects of the invention;

DETAILED DESCRIPTION

Figure 1:
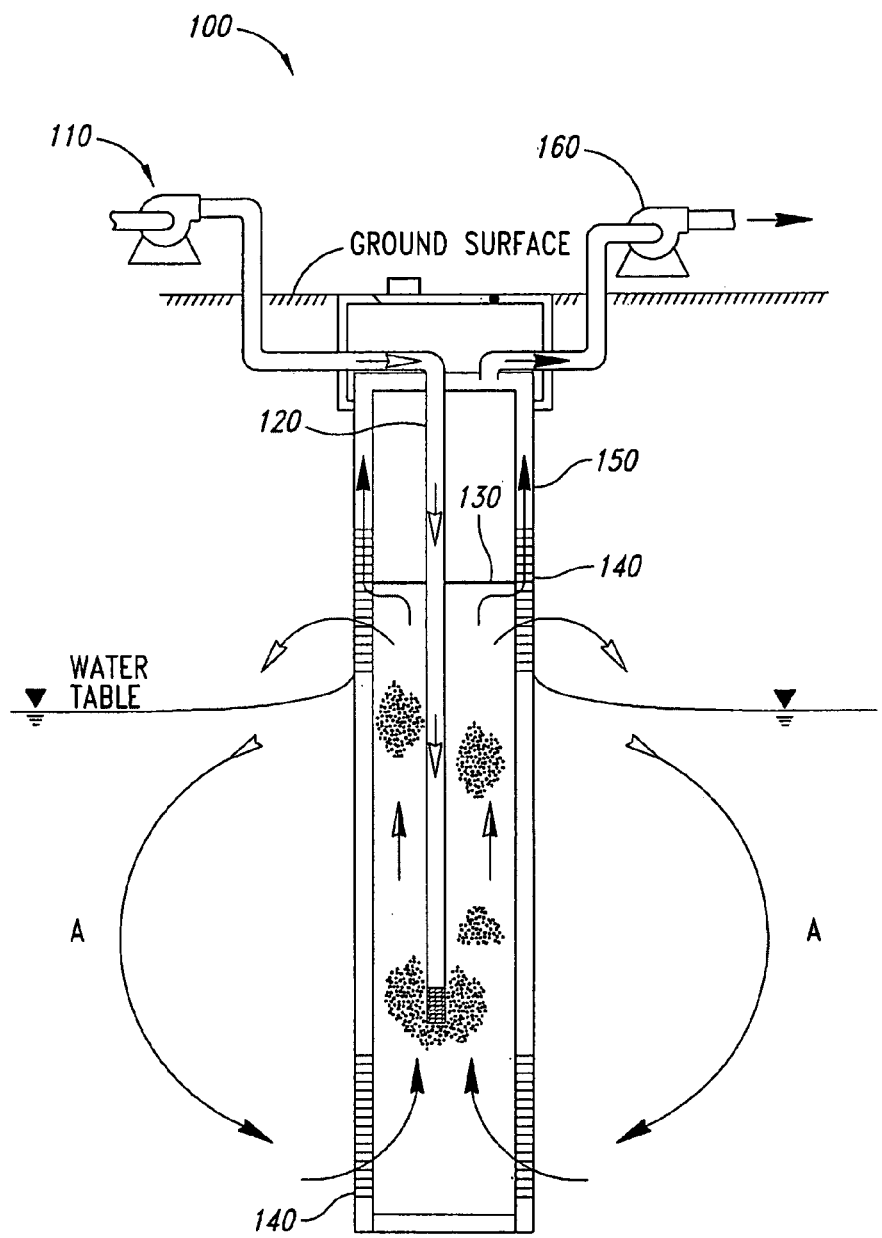
FIG. 1 illustrates an in-well vapor stripping process.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

In *Environmental Engineering Reference Manual*, Professional Publications, Belmont, Calif., 2001, p. 18-2, which is hereby incorporated by reference in its entirety, Michael R. Lindeburg, P. E., states:

Pumps can be classified according to the method by which pumping energy is transferred to the fluid. This classification separates pumps into positive displacement pumps and kinetic energy pumps.

The most common types of positive displacement pumps are reciprocating action pumps (which use pistons, plungers diaphragms, or bellows, and rotary action pumps (using vanes, screws lobes, or progressive cavities). Such pumps discharge a fixed volume for each stroke or revolution. Energy is added intermittently to the fluid.

Kinetic pumps transform fluid kinetic energy into fluid static pressure energy. The pump imparts the kinetic energy; the pump mechanism or housing is constructed in a manner that causes the transformation. Jet pumps and ejector pumps fall into this kinetic energy category, but centrifugal pumps are the primary examples.

In some embodiments of the present invention, the fluid flow system's pump has no moving parts. Instead, in these embodiments, the fluid flow system of the present invention imparts energy to the fluid by converting the energy of pressurized gas first into potential energy. The potential energy of the pressurized gas released at the bottom of the gas-lift passage elevates the liquid above it to a height proportional to the volume of liquid displaced by the gas. In so doing the potential energy of the pressurized gas is efficiently transferred into the potential energy of gas/liquid mixture. The potential energy of the elevated gas/liquid mixture is then transformed into kinetic energy as the gas/liquid mixture rises, owing to the pushing action of the rising bubbles and, to a much greater extent, the density difference between the gas/liquid mixture and the surrounding liquid. An equilibrium is then established, wherein the gas exiting the top of the liquid is equaled by the gas entering the bottom of the gas-lift conduit. The height of the gas/liquid mixture above the static fluid level is then proportionate to the volume of liquid displaced by the gas traveling through it. As the gas/liquid mixture degasses, at the top of the gas-lift passage, the fluid returns to near its original density, and falls back down to the original elevation. Because incoming and/or exiting liquid flows are confined by conduits into and/or out of the gas-lift passage, a controllable and directional fluid flow is generated.

Although some embodiments of the invention have no moving parts, a system that includes moving parts to assist in moving fluid through the various parts of the system described herein is not precluded and is within the spirit and scope of the present invention.

While elegantly in concept, the applications for the fluid flow system described herein are myriad. The first application, the fluid flow remediation system, will be discussed in greatest detail. This in-depth discussion will then serve as the foundation for the fluid flow applications which follow in this description.

In one embodiment of the invention, the fluid flow remediation system is placed underground, situated in a specifically designed well. The well is constructed with well screens at the top and bottom ends of the decontamination system. The top well screen is of sufficient height as to encompass both the highest and lowest observed and/or predicted (depressed) groundwater elevations. The well is completed by surrounding the outside of the screens with sand or other similarly hydraulically conductive material.

This embodiment of the invention also includes an impermeable layer between upper and lower well screens, outside the well, to prevent convection currents "short-circuiting" up the outside of the well. A ring seals the device to inside of the middle of the well to preclude vertical, in-well flow.

The fluid flow remediation system of the present invention can utilize other known remediation techniques such as soil vapor extraction techniques simultaneously with other modifications. As will be understood, with the principles taught herein additional embodiments of the invention may be obtained through the use of bioremediation principles and other physical and chemical treatment technologies.

Various embodiments of the system described herein may include one or more of the following benefits:

1. The contamination plume is reduced or eliminated;
2. VOCs are removed from the groundwater via in-well air stripping;
3. Surrounding soils are flushed by convection currents generated; and
4. Dissolved oxygen is increased in the groundwater, promoting biological activity and volatilization of contaminants.
5. Introduction of gas phase oxidants, such as ozone, may accelerate contaminant removal.

Figure 2:
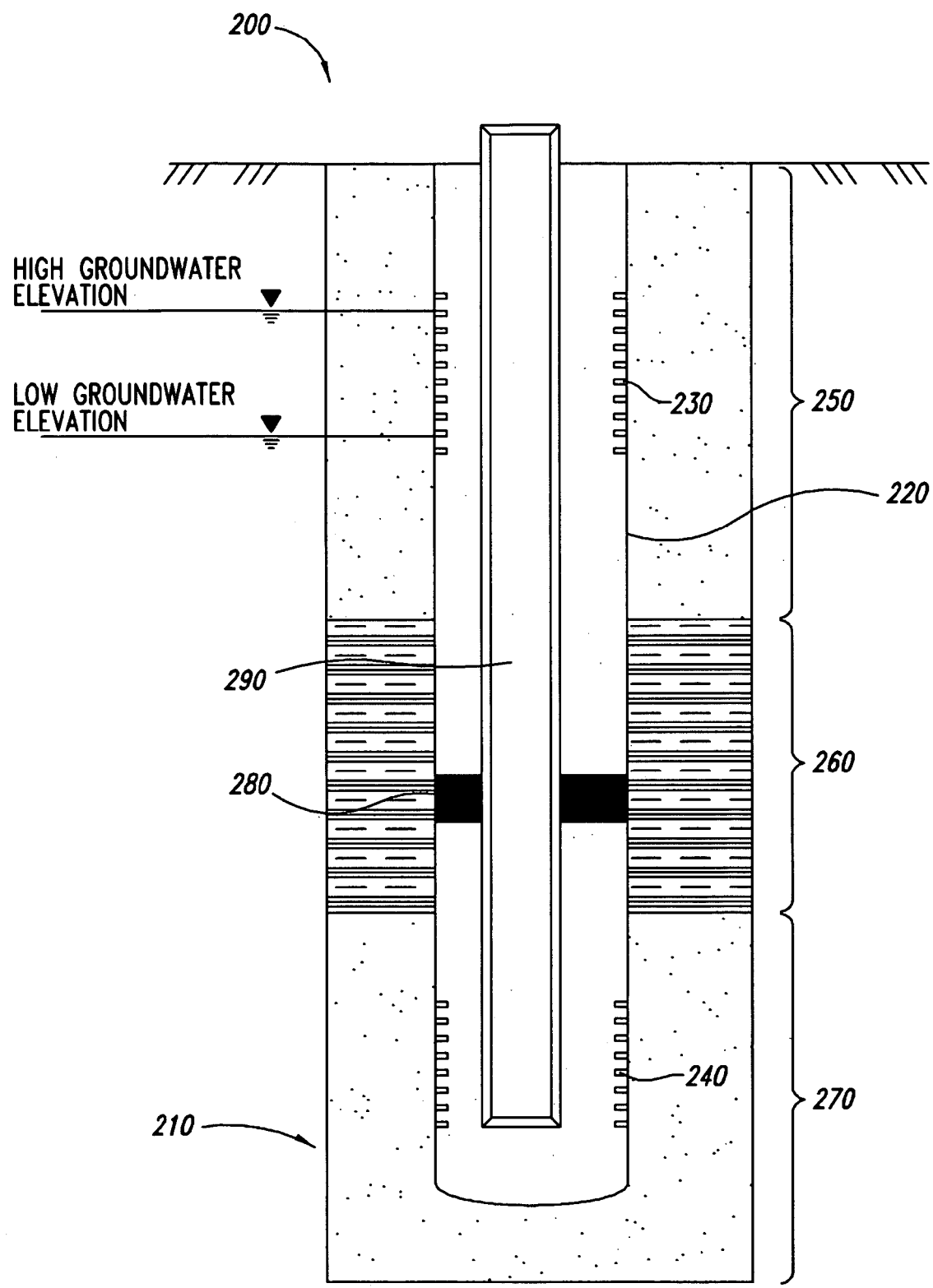
FIG. 2 illustrates a well or borehole construction surrounding a remediation system in accordance with an aspect of the invention.

FIG. 2 illustrates one embodiment of the current invention, namely, the well or borehole 200 construction surrounding the remediation system. In the illustrative embodiment, a borehole 210 is drilled of sufficient diameter to allow a casing 220 to be inserted thereof. The casing 220 includes a first well screen 230 at an upper inlet end of the casing 220 and a second well screen 240 at a lower outlet end of the casing 220. The first well screen 230 is positioned to extend a range including the expected high and low ground water elevations and accounts for additional drawdown created by the fluid flow. By drawing intake water from at, or near, the groundwater's surface, treatment will be given to the highest concentrations of contaminants, which are less dense than water. A third region 270 in the lower portion of the borehole 210 may include a porous material surrounding the second well screen between the casing 220 and the borehole 210.

After installing the casing 220 in the borehole 210, filler material may be placed around the outside of the casing between the casing and the borehole to enhance the operation of the remediation system. In one embodiment of the invention, three regions of material are used. An upper region 250 of the borehole 210 includes a porous material surrounding the screen 230. The porous material may, for example, include sand in the 2 to 20 size range. A lower region 270 at the bottom of the borehole 210 may also include a porous material surrounding the second well screen between the casing 220 and the borehole 210. A, middle region 260 of the borehole 210 includes an impermeable layer filling the gap between the borehole 210 and the casing 220. The impermeable layer may, for example, be bentonite. The impermeable layer acts to preclude vertical flow adjacent to the outside of the well's casing and causes the convection currents to pass through the surrounding matrix. Shown in FIG. 2, an impermeable ring 280 is positioned between the casing 210 and the remediation system 290 to hydraulically separate the casing from the remediation system. The impermeable ring also provides stability to the remediation system within the casing. The impermeable ring serves to block in-well vertical flow outside of the remediation device 290. The impermeable ring may, for example, be a packer assembly, metal plate, rubber gasket, grout seal, or an inflatable/deflatable cylindrical shape, which ensures one-directional flow of water into the well, in through the upper screen in the casing, and out of the well's lower screen.

In operation, water enters the decontamination system at the elevation of the water table into the intake conduit, filling the intake conduit. The intake conduit is fluidly connected to the gas-lift conduit at an open lower end of the gas-lift conduit. Thus, as the intake conduit fills, so too does the gas-lift conduit.

Air (or another gas) is injected into the gas-lift conduit through a gas injection line using a vacuum blower, compressor, diffuser plate, or other means releasing bubbles into the contaminated groundwater. The resulting bubbles aerate the water, forming an air-lift pumping system and causing groundwater to flow upward in the gas-lift conduit.

The gas bubbles rise through the water in the gas-lift conduit and also lift the water due to a density gradient (groundwater in the gas-lift conduit containing air bubbles is less dense than groundwater in the intake conduit without bubbles). As the bubbles rise through the VOC-contaminated groundwater, those compounds with higher vapor pressures are transferred from the liquid to the gas phase, through an air stripping process.

Conversely, as the air passes through the water, $O_2$ is transferred, increasing the level of dissolved oxygen in the groundwater. Biological remediation of the surrounding soils and groundwater is thereby accelerated, as oxygen is typically the least available essential nutrient in these highly reduced environments. The elevated levels of dissolved gases in the water exiting the fluid flow pump system also act to volatilized contaminants in the surrounding soil water matrix. The air/water mixture rises until it reaches an equilibrium head above the water table, at the top of the gas-lift conduit. The height the air/water mixture rises above the surrounding groundwater table and is proportionate to the volume of water displaced by the air passing through the gas-lift passage.

An off-gassing line allows gas to be removed from the top of the gas-lift conduit, causing the liquid's density to increase. The off-gassing line may be under a vacuum. The vacuum would act to increase the height differential between the static groundwater level and the air/water liquid level in the gas-lift passage, increasing the pump's head and fluid flow rates, by decreasing the downward atmospheric pressure in the gas-lift passage. The vacuum may also accelerate mass transfer rates of the VOCs from the groundwater to the air passing through the gas lift passage. The vacuum at the top of the gas lift passage may be generated from the intake of the air supply blower, from a separate power source, or as part of a larger soil vapor extraction (SVE) system. The vapor may be collected for treatment and/or recirculation or may be released directly to the atmosphere. The water at the top of the gas-lift passage now returns to near its original density and having the VOCs removed then sinks through the down and out conduit. At the lower well screen, the decontaminated water flows out into the surrounding soil.

Figure 3:
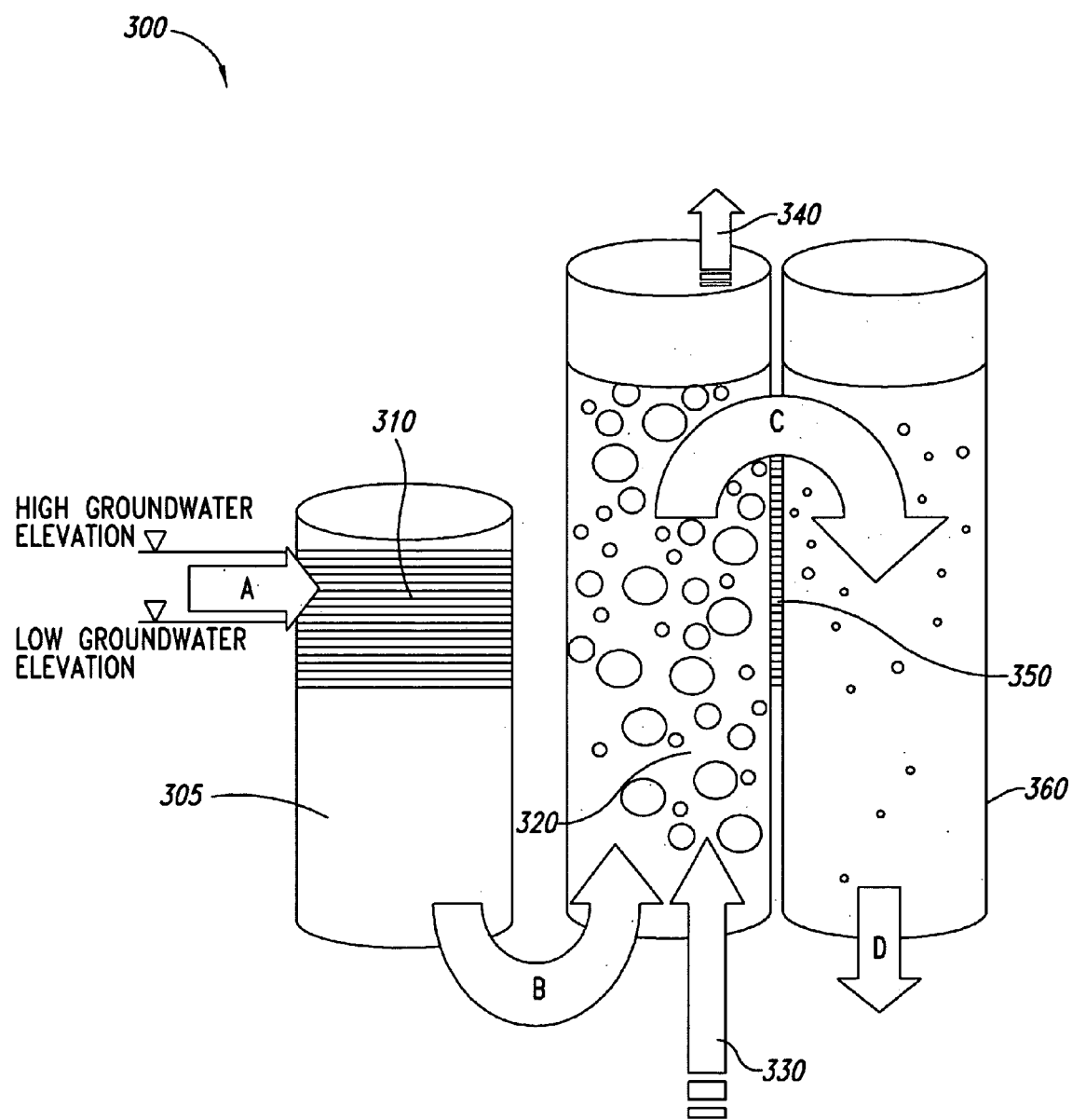
FIG. 3 illustrates the groundwater flow and operation of a fluid flow remediation system in accordance with an aspect of the invention.

FIG. 3 illustrates the groundwater flow and operation of the fluid flow remediation system of the current invention, according to one embodiment of the invention. Along flow arrow A, groundwater enters an intake conduit 305 through an intake screen 310. The intake screen 310 encompasses the span of the high, low, and anticipated drawdown groundwater levels. Groundwater flows from the intake conduit 305 into a lower portion of an air-lift conduit 320. Pressurized air 330 also enters at a lower portion of the air-lift conduit or conduit 320. Pressurized air 330 creates an upward flow. Off-gasses 340 are removed at an upper portion of the air-lift conduit 320. Water follows flow arrow C through a fluidic couple 350 into an eductor or down and out conduit 360. Treated water reenters the aquifer along flow path D.

The following description details an operational flow path of the groundwater as it enters exemplary decontamination system 300.

1) Groundwater enters from a well's top screen, which is high and low enough to envelope water level fluctuations. Both wells' top and bottom screens are surrounded with porous material such as sand, to facilitate hydraulic conductivity. An impermeable layer between sand layers outside the well, and a packer positioned in the middle of the decontamination system and the well's inside casing, prevent convection currents from short-circuiting.

2) Dense groundwater is pulled down intake conduit by suction created at the bottom intake port to the gas-lift conduit.

3) Groundwater and pressurized air meet at the bottom of the gas-lift conduit.

4) Flow is powered by the rising action of introduced air. The water is pushed up by the rising action of the bubbles and the density differential between the air entrained water and the denser, surrounding groundwater.

5) The air entrained water rises above the groundwater's level due to the density differential. The height the air/water mixture rises above the surrounding groundwater and is proportionate to the volume of water displaced by the air traveling through the gas-lift conduit. At the top of the gas-lift conduit, air separates from the groundwater.

6) The near original density groundwater now leaves the gas-lift conduit to the down and out conduit. The transfer portals between the two conduits have the same bottom elevation as the initial intake screen, but may also be higher, to accommodate the higher water column in the gas-lift conduit. This design allows for water flow during any anticipated groundwater elevation.

7) The components in the groundwater with sufficient vapor pressure will have transferred from the liquid to the gas phase, through a process called air stripping. These components will be carried off with the exiting air, for possible further treatment, prior to either venting to the atmosphere or being recycled back to the bottom of the air-lift conduit. Air bubbles contacting the water also increase the level of dissolved oxygen in groundwater.

8) Purified and oxygenated groundwater leaves the fluid flow decontamination system through the bottom of the well where it reenters the environment.

Figure 4:
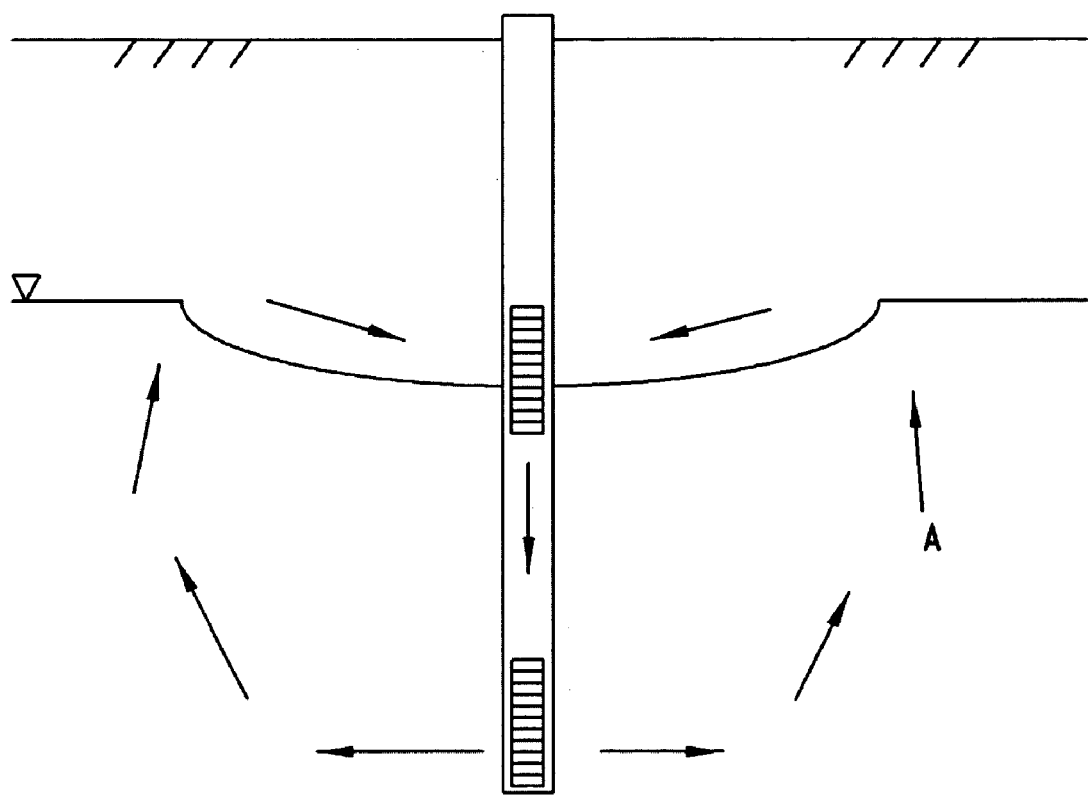
FIG. 4 illustrates a flow pattern of a remediation system in accordance with an aspect of the invention.
Figure 5:
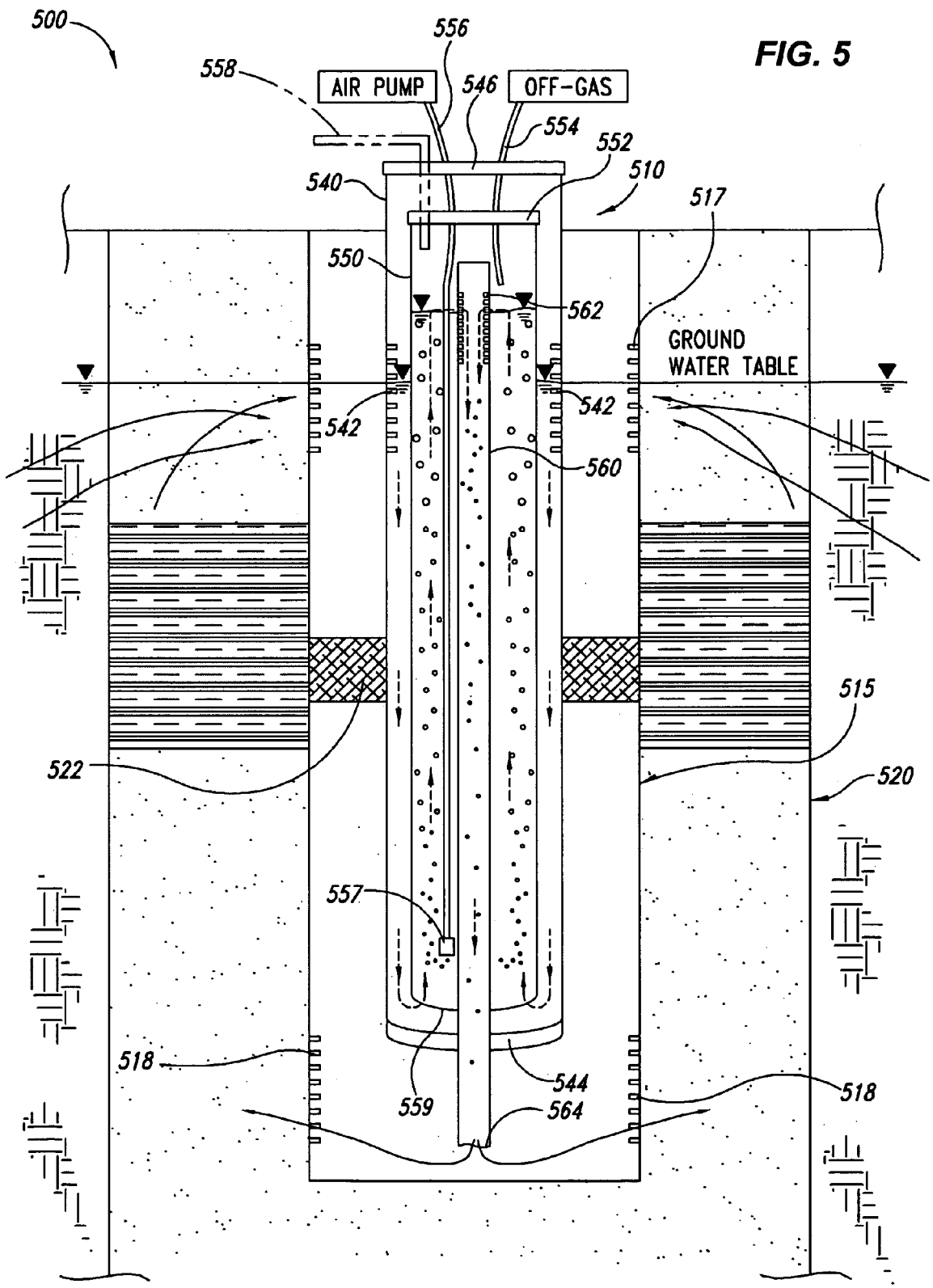
FIG. 5 illustrates an exemplary embodiment of a fluid flow remediation system.

9) FIG. 4 illustrates the flow pattern A of the remediation system. As illustrated, the fluid flow remediation system of the present invention creates an upward and inward current draw which serves to contract the plume and accelerates remediation of the site. The outward pressure of water at the bottom of the well coupled with the cone of depression created by the suction of the device will create convection currents. These currents will push the groundwater away from the bottom of the well, upwards, and inwards toward the top of the well. This action will continually flush the soil, facilitating contaminant desorption and/or detachment, which is ultimately the rate limiting step in most soil remediation processes. This convection pattern will also help to contract other expanding plumes One exemplary embodiment of the fluid flow remediation system 500 is illustrated in FIG. 5, which also depicts a functional prototype. The fluid flow system 500 is used as an in situ groundwater remediation device 510. A casing 515 is positioned inside a borehole 520, and the fluid flow system/remediation system 510 is positioned within the casing 515. The casing includes slots 517 at an upper end and slots 518 at a lower end to allow groundwater to flow into and, if needed, out of the casing 515. A packer 522 is positioned between the casing 515 and an outer housing of the remediation system 510.

The fluid flow system 500 includes a first conduit 540, a second conduit 550 fluidly connected with the first conduit, and a third conduit 560 fluidly connected with the second conduit 550. The three conduits are concentric, with the intake at the outside, the gas-lift in the middle, and the down and out nearest to the center.

The first outside conduit 540, alternatively referred to as the intake conduit, includes perforations 542 to allow groundwater to flow into the outside conduit 540. The perforations 542 in the intake conduit 540 of the present embodiment are positioned to incorporate the groundwater table elevation range and anticipated drawdown as described previously.

The second middle conduit 550, alternatively called the gas-lift conduit, includes a top portion having a cap 552 thereon. The cap 552 is sealed to prevent gas or fluid from escaping, which could, in turn, pressurize the intake passage, and possibly preclude inflow. The cap 552 includes water and airtight apertures for an off-gassing line 554, a gas intake line 556, and an optional retrieval cable 558. In accordance with the present embodiment, the gas-lift conduit is in fluid communication with the intake conduit 540. The gas-lift conduit 550 includes an open end 559, allowing water to flow into the bottom of the gas-lift conduit 550 from the intake conduit 540. The intake line 556 includes an air discharge device 557 at the distal end positioned within and near the bottom of the second conduit 550, such that bubbles can only rise inside the gas-lift conduit.

The third center conduit 560 is in fluid communication with the second conduit 550 through a series of perforations 562 at a top end of the third conduit 560. The perforations 562 are positioned to incorporate the increase of the water table elevation from the lower density air-entrained water, and hence elevated water in the second conduit. As gas is passed through the off-gassing line 554, near original density water flows through the perforations 562 down through the third conduit 560 and out through an outlet 564 positioned above the elevation of the casing 515. The water passes through outlet 518 and the surrounding sand prior to returning to the aquifer. The water leaving the outlet 518 typically contains a higher level of dissolved oxygen and lowered levels of VOCs than the water entering perforations 542.

Figure 6A:
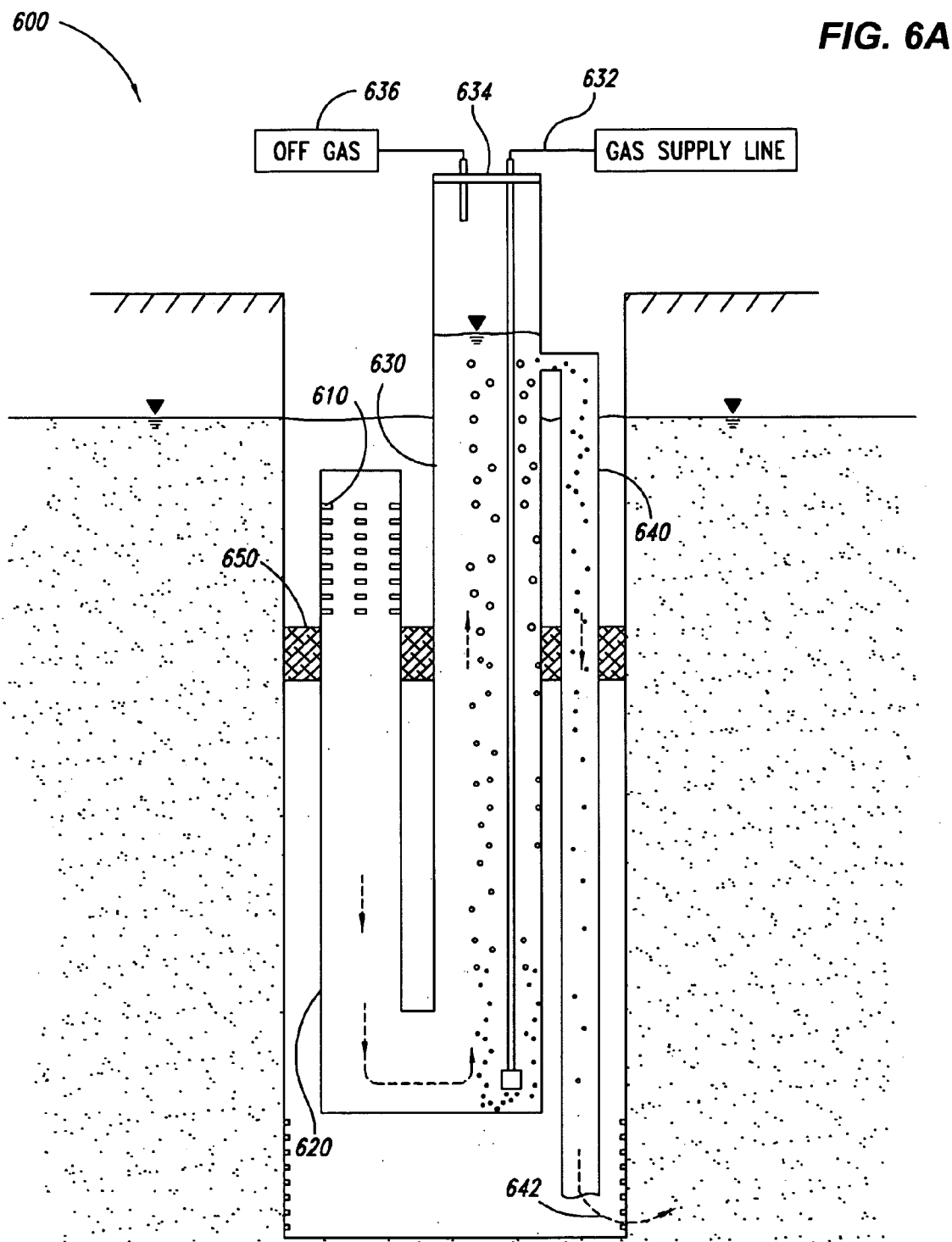
FIG. 6A illustrates an embodiment of a fluid flow remediation system in which the conduits are spatially separated.

Yet another alternative embodiment of the present invention is shown in FIGS. 6A and 6B. FIGS. 6A and 6B illustrate non-concentric conduits of the water flow system in use as a fluid flow water remediation system. FIG. 6A illustrates spatially separated conduits, while 6B depicts vertically adjacent conduits. As discussed with respect to FIG. 5, FIGS. 6A and 6B include slots or perforations 610 allowing fluid to flow into a first conduit 620. The first conduit 620 is in fluid communication with a second conduit or chamber 630. The second chamber includes a gas supply line 632 for supplying gas into the conduit. In the present embodiment the gas supply line is positioned at the lower elevation of the second conduit. The addition of gas into the second conduit provides a density differential in the fluid, yielding a less dense fluid and increasing the height of the water table elevation. The top of the second conduit 630 includes an air and watertight cap 634. The gas supply line 632 may penetrate this cap 634. Additionally, an off-gas line 636 is provided which may also perforate the cap 634. Alternatively, the cap 634 may incorporate a gas absorption device and may not require a separate off-gassing line.

The lower density fluid contained in the second conduit 630 is in fluid communication with the third outlet conduit 640. As entrained gas is off-gassed through the off-gas line 636 or through a gas absorption cap 634, the water density decreases and through natural convection flows down through the third conduit 640. In operation, some of the gas bubbles are trapped as the water begins to flow down the third conduit 640, and may dissolve in the length of laminar flow provided in the third conduit. The third conduit 640 includes an outlet 642 positioned at the lower elevation of the conduit to allow the fluid to re-enter into the aquifer. Water flowing back into the aquifer has been stripped of volatile organic compounds and other contaminants with sufficient vapor pressures, and additionally includes higher levels of dissolved oxygen, thus providing an increased remediation and volatilization effect upon re-entering into the aquifer.

A packer 650, prevents short-circuiting of convection currents between the borehole and the conduits shown in FIGS. 6A and 6B.

Another embodiment of these applications provides in-well air stripping and an increased level of dissolved oxygen, but generates no through-the-formation vertical convection currents. Distal intake and down and out ports, on or near the same horizontal plane, generate sideways convection currents. An advantage of this configuration, which has no lower well screen, is that it allows treatment of an upper aquifer, without potential cross-contamination of a deeper aquifer.

Figure 11:
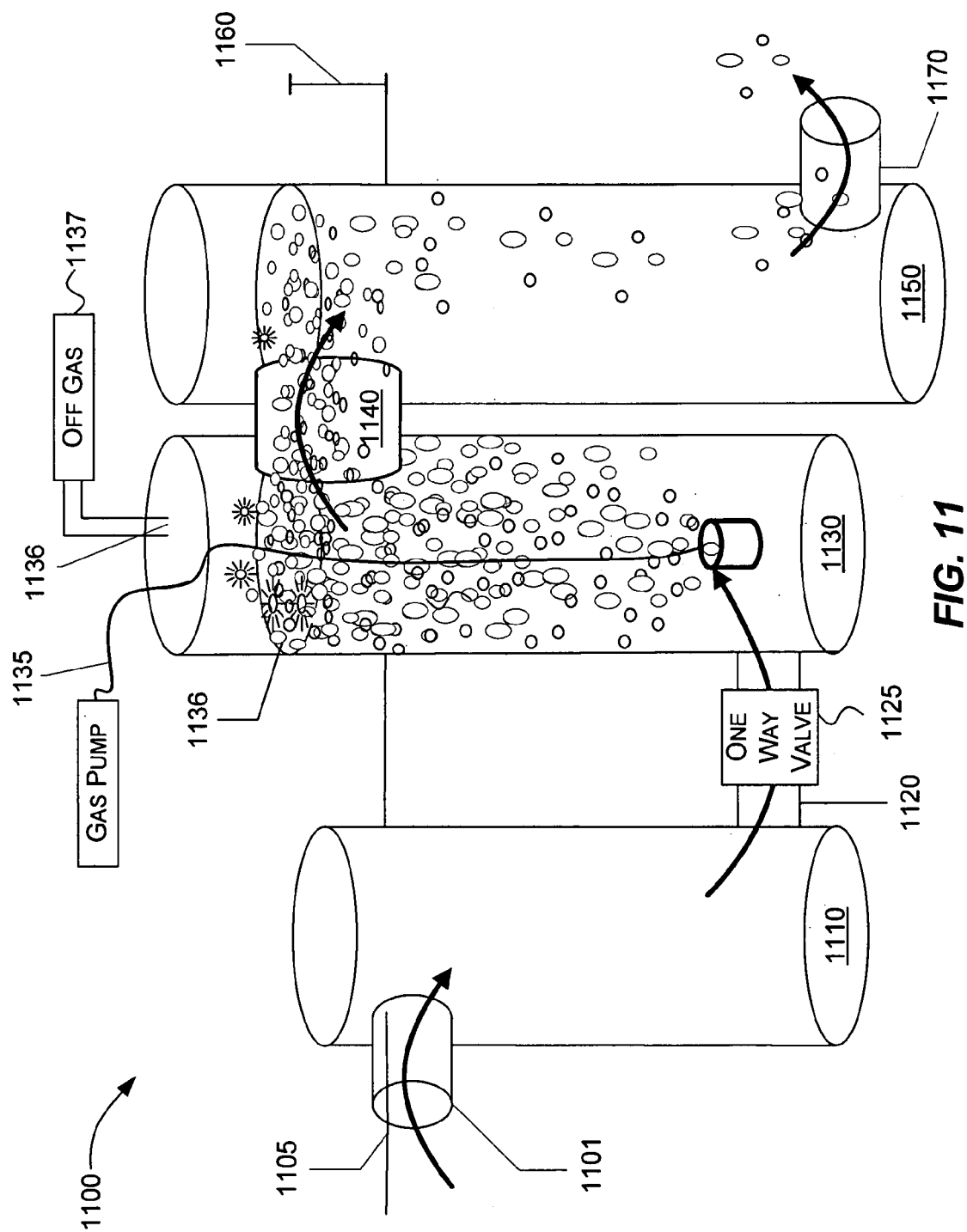
FIG. 11 illustrates another system for practicing the present invention, in accordance with various aspects of the invention.

FIG. 11 illustrates another system for practicing the present invention, in accordance with various aspects of the invention. In normal operation, fluid enters into the system 1100 through an inlet port 1101, flows down in a chamber 1110, flows through a conduit 1120 to the bottom of a chamber 1130, flows up in the chamber 1130, flows through a conduit 1140 to a chamber 1150, flows down in the chamber 1150, and flows out through an exit port 1170. This flow pattern is created in large part by the configuration of the system together with gas that is emitted into the chamber 1130.

A line 1105 depicts a static fluid level. The intake port 1101 may be placed to incorporate the groundwater table elevation range and anticipated drawdown as described previously. The intake port 1101 may be replaced with another structure or mechanism for allowing fluid to enter the system, such as perforations in chamber 1110, multiple intake ports, and the like. In system 1100, fluid from the environment enters through intake port 1101.

It will be recognized that when unsealed the bottoms of chambers 1110 and 1130 may also be used as intake ports. To prevent fluid from being collected from the bottoms of chambers 1110 and 1130, the bottoms may be sealed.

The first chamber 1110 is in fluid communication with the second chamber 1130 through the conduit 1120. As gas is injected into the chamber 1130 at a higher rate, the increased pressure causes bubbles to move further and further down in the chamber 1130. Once the pressure of the gas injected exceeds the head, there is a potential of fluid and gas flowing from the chamber 1130 to the chamber 1110. This may stop or reverse the flow pattern that occurs under normal operation. Preventing or minimizing this backward flow may be accomplished by placing a one way valve in the flow path before the gas emitter. For example, a one way valve 1125 may be placed in the conduit 1120. In other embodiments, the one way valve may be placed in chamber 1130 below the gas emitter or in chamber 1110, also preferably below the level of the gas emitter. The one way valve may allow fluid to pass from chamber 1110 to chamber 1130 but prevent or reduce fluid and gas flow in the opposite direction.

If gas is injected into the chamber 1130 at a sufficiently high rate, a "pulsing" action may occur. In the pulsing action, when the pressure becomes such that the flow would begin to reverse and start going out chamber 1110, the one way valve 1125 closes. Then, as gas continues to be injected into the chamber 1130, the gas expels fluid from the chamber 1130 until the pressure in the chamber 1130 is less than the pressure in the chamber 1110. At this time, the one way valve allows fluid to flow from the chamber 1110 into the chamber 1130 until the pressure in the chamber 1130 again threatens to stop or reverse the flow.

Gas enters the chamber 1130 through the line 1135. In one embodiment of the invention, gas is emitted into the chamber 1130 at or near the bottom of the chamber 1130. In another embodiment of the invention, a one way valve is effectively created by selecting the placement of where gas is emitted into the chamber 1130 and/or by increasing the depth of where fluid enters into the chamber 1130 relative to the gas emission point. Increasing the depth of where fluid enters into the chamber 1130 may be done, for example, by increasing the length of the chambers 1110 and 1130 and keeping the gas emission point essentially constant. The maximum rate at which gas may be injected into the chamber 1130 before fluid and gas have the potential of flowing backwards (i.e., from chamber 1130 to 1110) may be governed by appropriate selection of the point at which the gas is emitted into the chamber 1130 relative to the bottom of the chamber 1130. Placing the point of gas emission further from the bottom of the chamber 1130 allows a relatively higher rate of gas emission without jeopardizing the flow pattern of the system 1100, while placing the point of gas emission closer to the bottom allows a relatively lower rate of gas emission.

It will be recognized that the ability to introduce a greater rate of gas has several advantages. A greater rate of gas may provide a higher lift of the fluid/gas mixture in the chamber 1130 above the gas emission point. The difference between the top of the fluid/gas mixture in the chamber 1130 and the surface water level is called the head. This difference is shown by the differential fluid level 1160. Having a greater difference (or head) creates more downward pressure in the chamber 1150. This allows more flow. In a tight soil formation, a greater flow will provide a larger radius of influence and a larger flow rate through the formation. This may help to clean the area in the radius of influence at a faster rate. More pressure also allows the chamber 1130 to extend to or above the ground surface.

The gas travels through the mixture, exits the fluid at fluid/gas interface 1136, and may leaves the chamber 1130 through the opening 1136, which is located at or near the top of the chamber 1130. The gas that passes through the opening 1136 is sometimes referred to as off gas 1137. The off gas 1137 may be passed through a filter, such as a carbon filter or a burner, before introducing it into the environment. Alternatively, the gas may pass through a filter and then be sent through the intake of the gas pump 1135. This provides at least three advantages. First, this creates a vacuum in the chamber 1130 (which allows an even greater head and increases the pressure differential between contaminates in the water and contaminates in the vapor, which accelerates the transfer of contaminates). Second, it creates a closed system such that contaminates are not released into the environment. Third, it reduces the amount of energy needed to supply the gas pump to create the same flow.

In the system above, a bleeder valve (not shown) may be inserted after the filter but before the gas pump 1135 to replace the gas that dissipates into the soil surrounding the system.

In one embodiment, a valve (not shown) is placed on the conduit that goes to the opening 1136. In the initial phases of cleaning ground water, much of the vapor that comes from the chamber 1130 through the opening 1136 may be heavily contaminated with the more volatile components. This heavily contaminated vapor may need special treatment. In a relatively short period of time (e.g., a few weeks or months), however, the contamination of the vapor coming through the opening 1136 may greatly decrease. The valve may be used to stop or reduce the flow of vapor coming through the opening 1136. Closing the value causes more gas to flow into the ground environment surrounding the system 1100 which may result in faster decontamination of the area within the radius of influence. This allows the device to change from an in-well air stripping mode to a more air sparging mode, as changing conditions may dictate. By simply closing or opening the off-gas valve and changing the pressure of gas emitted into the chamber 1130, the system 1100 may be caused to alternate between a mode of injecting stripped, oxygenated, and pressurized groundwater and a mode of pure-air sparging. In some embodiments of the invention, it may be advantageous to alternate between these two modes in a pulsing fashion.

The contamination of the vapor passing through the opening 1136 may be monitored, automatically, manually, or by some combination of the two. After a selected contamination threshold is reached, the valve may be closed or adjusted to allow less or no vapor to exit through the opening 1136.

The gas that gas pump 1135 may include or consist of a disinfectant such as chlorine, bromine, ozone, and the like. It will be recognized that ozone and other disinfectants may be particularly effective in treating water that has fecal material or other agricultural wastes. With sufficient head, water that has been treated in this way may be lifted and deposited in a water tower or container. This water may then be fit for human and livestock consumption. It will also be recognized that this way of obtaining water may avoid placing moving parts where they may be subject to corrosion, fouling, and the like.

Continuing along the normal flow path of the system 1100, the second chamber 1130 is in fluid communication with a third chamber 1150 through the upper conduit 1140. At point 1170, the fluid exits the pump out an exit portal. Differential fluid level 1160 depicts the additional height the fluid is raised above the static fluid level 1105. Differential fluid level 1160 is proportionate to the volume of gas traveling through the fluid. The flow velocity and or volume generated are also directly proportional to this height.

FIG. 14 illustrates another apparatus in which the present invention may be practiced, in accordance with various aspects of the invention. The apparatus includes an intake port 1405, an intake chamber 1410, a one way valve 1415, a gas emitter 1420, a gas lift chamber 1425, a down-and-out chamber 1430, and a gas supply line 1435.

In normal operation, fluid flows into the intake port 1405, down through the intake chamber 1410, up through the one way valve 1415, up through the gas lift chamber 1425, and down through the down-and-out chamber 1430. Gas flows up through the gas lift chamber 1425 and may exit through the top of the gas lift chamber 1425 (when an exit passage is provided there) and through the bottom of the down-and-out chamber 1430. In another embodiment of the invention, the top of the gas lift chamber 1425 is sealed. In this embodiment, the gas rises through gas lift chamber 1425 and flows down in down-and-out chamber 1430 to exit at the bottom of down-and-out-chamber 1430.

In the apparatus of FIG. 14, the one way valve 1415 is situated at the bottom of the gas lift chamber 1425 between the intake chamber 1410 and the gas lift chamber 1425. As described previously, a one way valve is a device, structure, or material that prevents or eliminates backward flow. It allows fluid and gas to essentially flow in a single direction. In general, the one way valve 1415 prevents or minimizes flow reversal.

The intake chamber 1410 may be sealed at the top and/or bottom except for down and out passage which passes through the bottom. The down-and-out chamber 1430 is open at both ends to allow fluid and gas to enter at the top and to exit at the bottom.

Some sample differences are illustrated in FIG. 14. It will be recognized that these differences are exemplary and that other differences may be obtained by appropriate configuration of the apparatus. The difference 1440 of 5 feet is the amount of head from the intake port to the bottom of the gas lift chamber 1425. The difference 1441 of 10 feet is the distance that fluid and gas are raised above the elevation of the intake port 1405 due to the operation of the apparatus. It will be recognized that the difference 1441 of 10 feet is supplied by a mixture of ⅓ water and ⅔ gas that is injected into the gas lift chamber 1425. Other differences may be obtained by varying this ratio accordingly and the head generated from the intake port 1405 elevation. The difference 1441 of 10 feet provides additional pressure in pushing fluid and gas out the down-and-out chamber 1430 into the surrounding environment.

It will be recognized that difference 1441 of additional head is proportionate to the volume of fluid displaced by the gas. When downward force exerted by available head in the intake conduit is greater than combined gas/liquid head in the gas-lift passage, flow through the apparatus occurs.

Figure 13A:
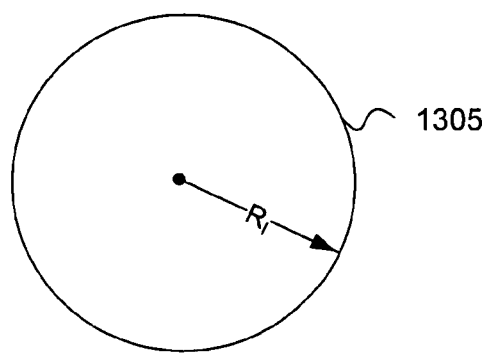
FIGS. 13A and 13B illustrate a system for controlling the area affected by a groundwater remediation system in accordance with an aspect of the invention.
Figure 13B:
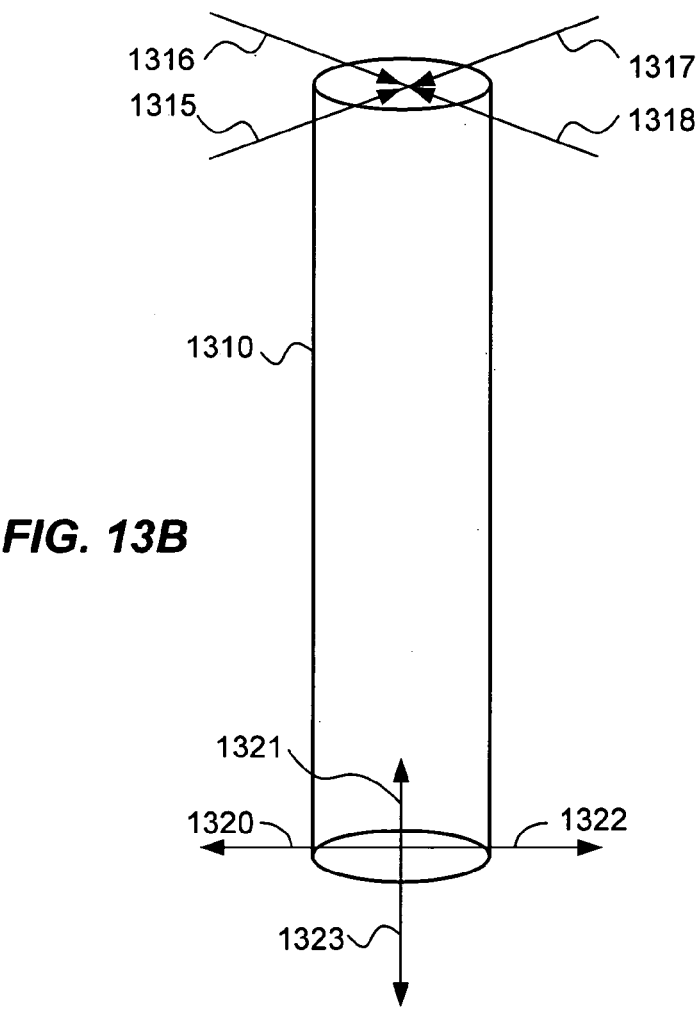

FIGS. 13A and 13B illustrate a system for controlling the area affected by a groundwater remediation system in accordance with an aspect of the invention. In the circle 1305, $R_i$ is the radius of influence of a typical groundwater remediation system. The radius of influence is sometimes measured by drilling a hole into the ground and pumping a gas, such as helium or air, into the hole and then measuring concentrations of the gas at selected points away from the hole. A certain concentration of gas may indicate the radius at which the system is effective in decontaminating the surrounding area.

In FIG. 13B, the apparatus 1310 is an apparatus similar to that shown in FIG. 5 (without the details of what is inside the apparatus shown). Lines 1315–1318 represent where trenches may be placed to provide an in-flow path for fluid collected by the apparatus 1310. The trenches may be filled with perforated pipes, or otherwise, to more readily collect fluid in a pattern desired.

Similarly, lines 1320–1323 represent where trenches may be placed to provide an out-flow path for fluid expelled by apparatus 1310. As above, each of trenches may be filled with a perforated pipe and gravel to more readily distribute expelled fluid in a pattern desired. In addition, each of the trenches may be capped with an impermeable material to prevent fluid from short-circuiting directly upwards. Lines 1320–1323 are offset by 90 degrees from corresponding lines 1315–1318. This placement gives one approach of obtaining fluid from targeted regions and providing treated fluid to other targeted regions. It will be recognized that other patterns may be implemented to target arbitrary regions without departing from the spirit or scope of the invention.

FIGS. 16–20 illustrate various embodiments of the invention that may be used in installing and operating a system that works in accordance with various aspects of the invention. One advantage of the embodiments described below is they do not require an outer well that has screens placed therein (as shown in FIG. 5, elements 517 and 518 and other screens on the outer well). Not having the exterior screens in the outer well eliminates the cost of manufacturing, installing, and maintaining them. Another advantage is that the embodiments described below may be used to maximize the cross-sectional area available to treat the water in proportion to the outer well size. Another advantage of the embodiments described below is the ability to maintain good downward pressure through the use of a float on the down-and-out tube.

Figure 16:
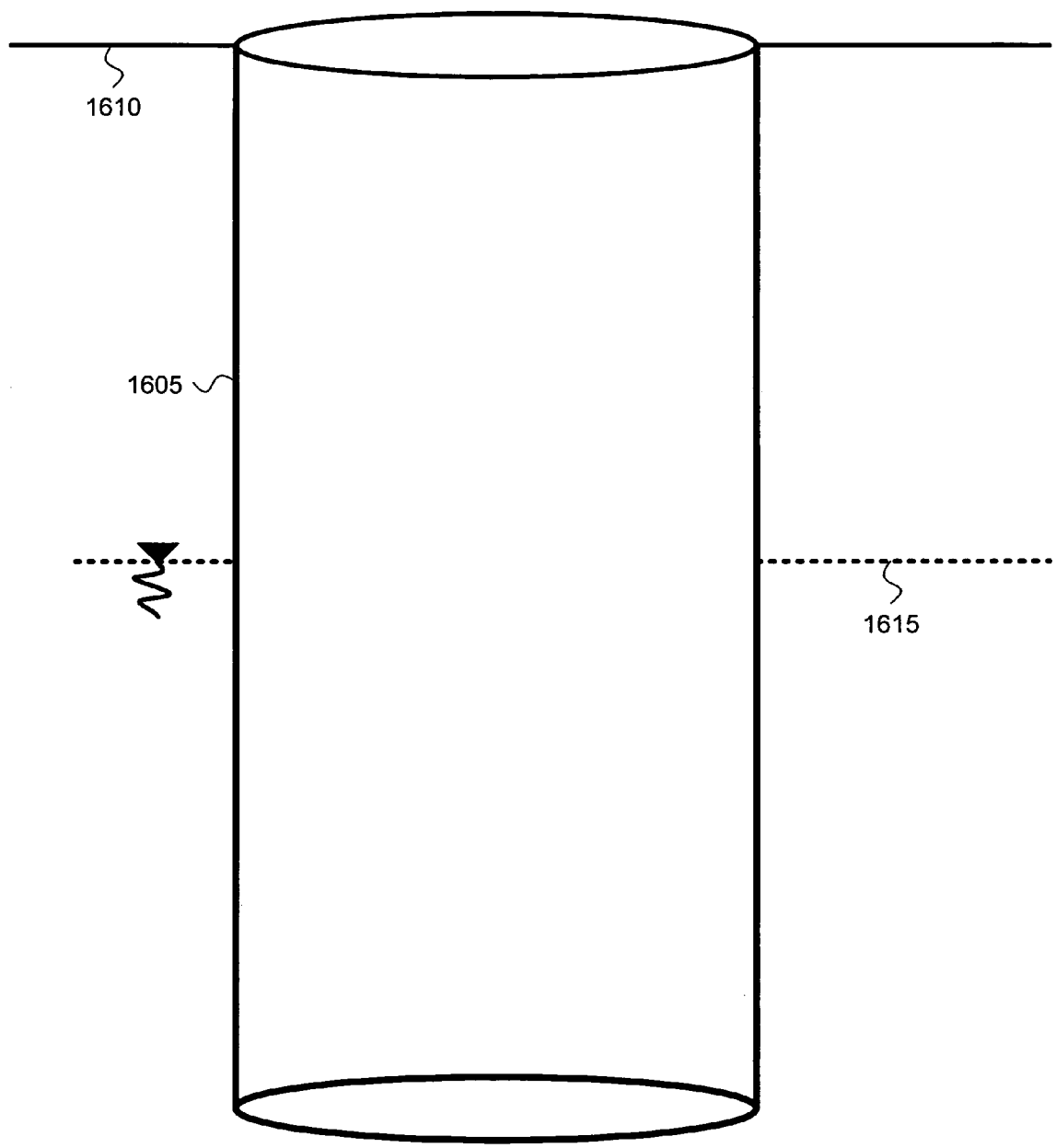
FIGS. 16–21 illustrate various embodiments of the invention that may be used in installing and operating a system that works in accordance with various aspects of the invention.

Turning to FIG. 16, a well casing 1605 may be installed at a contaminated site. In one embodiment of the invention, the well casing 1605 is 18 inches in diameter and may extend 40 or 50 feet below a ground surface 1610. Other diameters, shapes (e.g., non-circular), and depths of well casings may be employed without departing from the spirit or scope of the invention. It will be understood that well casings with larger cross-sectional areas may provide a larger surface area with which to obtain fluid and/or a larger surface area through which gas may be in contact with the fluid. Having a larger cross-sectional area may allow a higher flow rate to travel through a remediation system that includes the casing. Typically, the well casing 1605 extends below an average water surface level 1615. After the preassembled chamber 1705 of FIG. 17 is installed within the well casing 1605, the well casing 1605 is removed to provide hydraulic communication between the preassembled chamber 1705 and the environment surrounding the well casing 1605.

Figure 17:
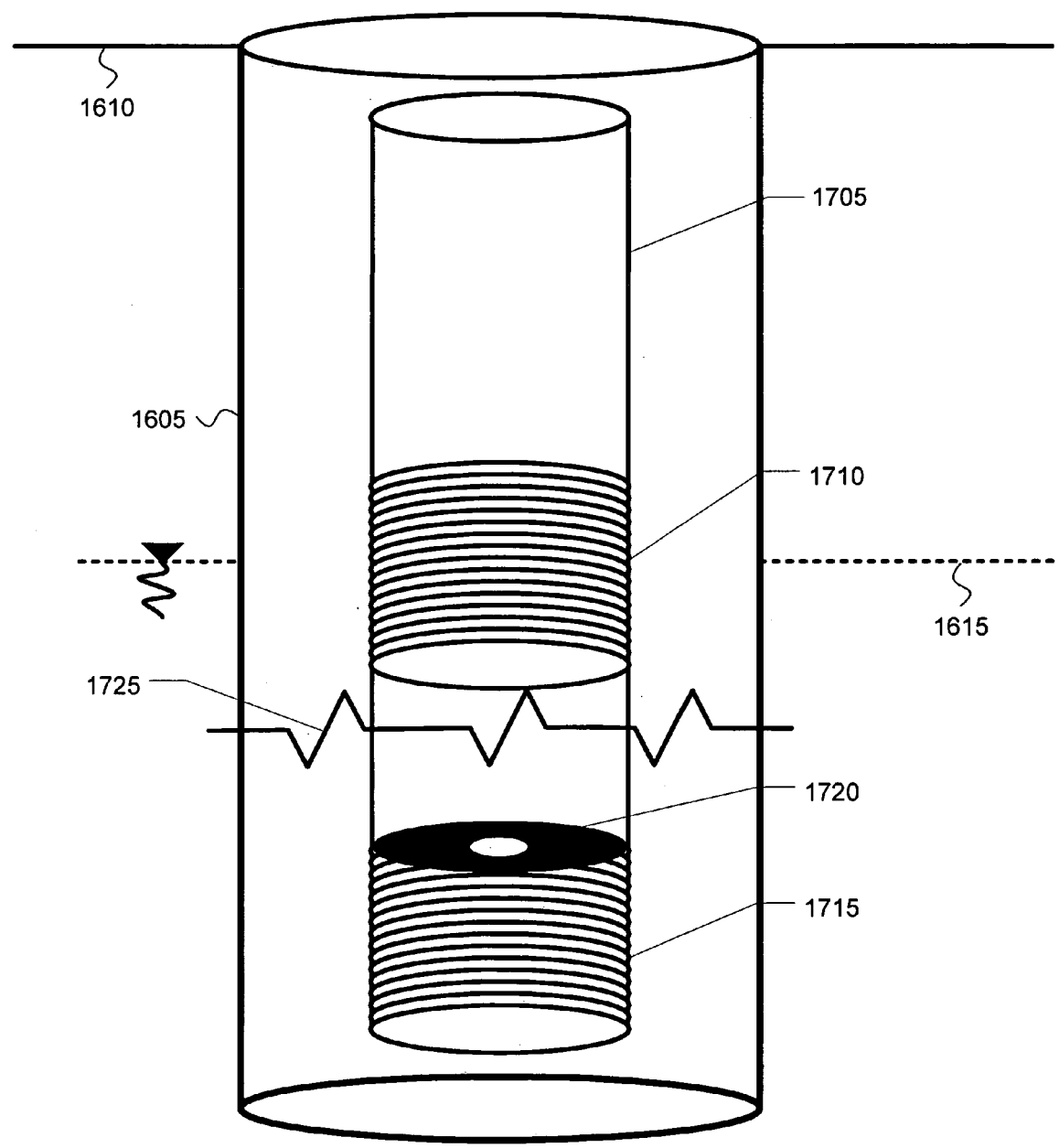

Turning to FIG. 17, after the well casing 1605 is installed a preassembled chamber 1705 may be placed within the well casing 1605. The preassembled chamber 1705 may be floated a desired distance from the bottom of the well casing 1605. The preassembled chamber 1705 includes an inlet screen 1710 and an outlet screen 1715. Fluid enters preassembled chamber 1705 through the inlet screen 1710 and exits through the outlet screen 1715. In one embodiment, each of the screens 1710 and 1715 is made by applying three feet of 12-inch Johnston "V-Wrap" or its equivalent.

Figure 19:
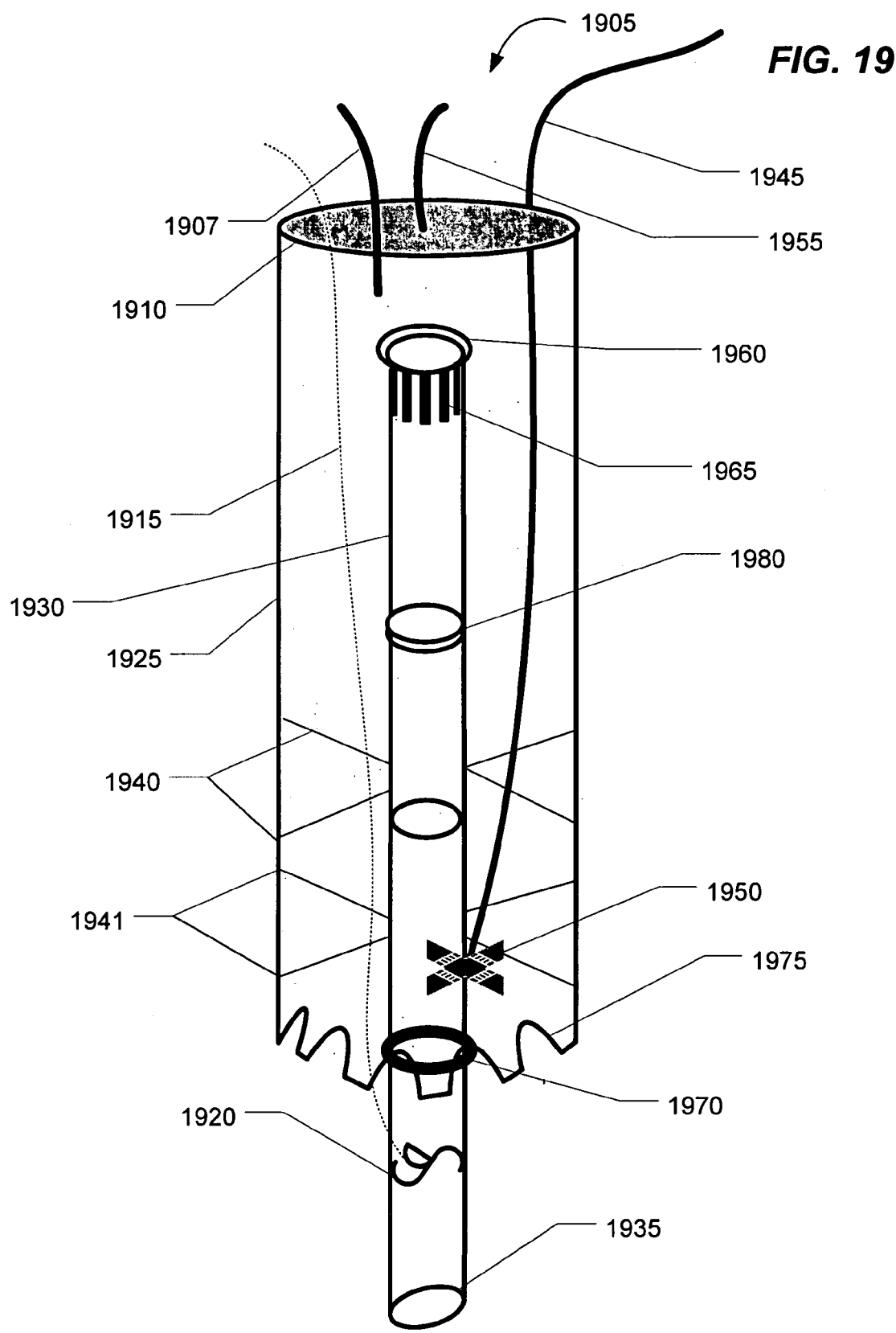

The walls of the preassembled chamber 1705 may be formed from any material that is impermeable to the fluid, depending on the application. In one embodiment, the walls are formed from a schedule 40 steel tube. In another embodiment, the walls are formed from a schedule 80 steel tube or PVC pipe. It will be recognized that steel tube may be used for many reasons including its resistance to ozone, its ability to have fasteners welded to it for securing the inlet and outlet screens, its ability to have a plate 1720 welded to it for placing a down-and-out apparatus (as shown in FIG. 19), and otherwise.

The plate 1720 may fulfill several functions. First, the plate 1720 may provide support for holding the gas lift and down-and-out apparatus. Second, the plate 1720 forms the bottom of the intake passage and prevents any internal short-circuiting of fluid except through the hole in the plate, which is sealed off by the down-and-out apparatus placed thereon (not shown).

Line 1725 indicates that the well casing 1605 and the preassembled chamber 1705 may be longer or shorter in length without departing from the spirit or scope of the invention. Indeed, it will be understood that the FIG. 17 may not necessarily represent a scale drawing.

Figure 18:
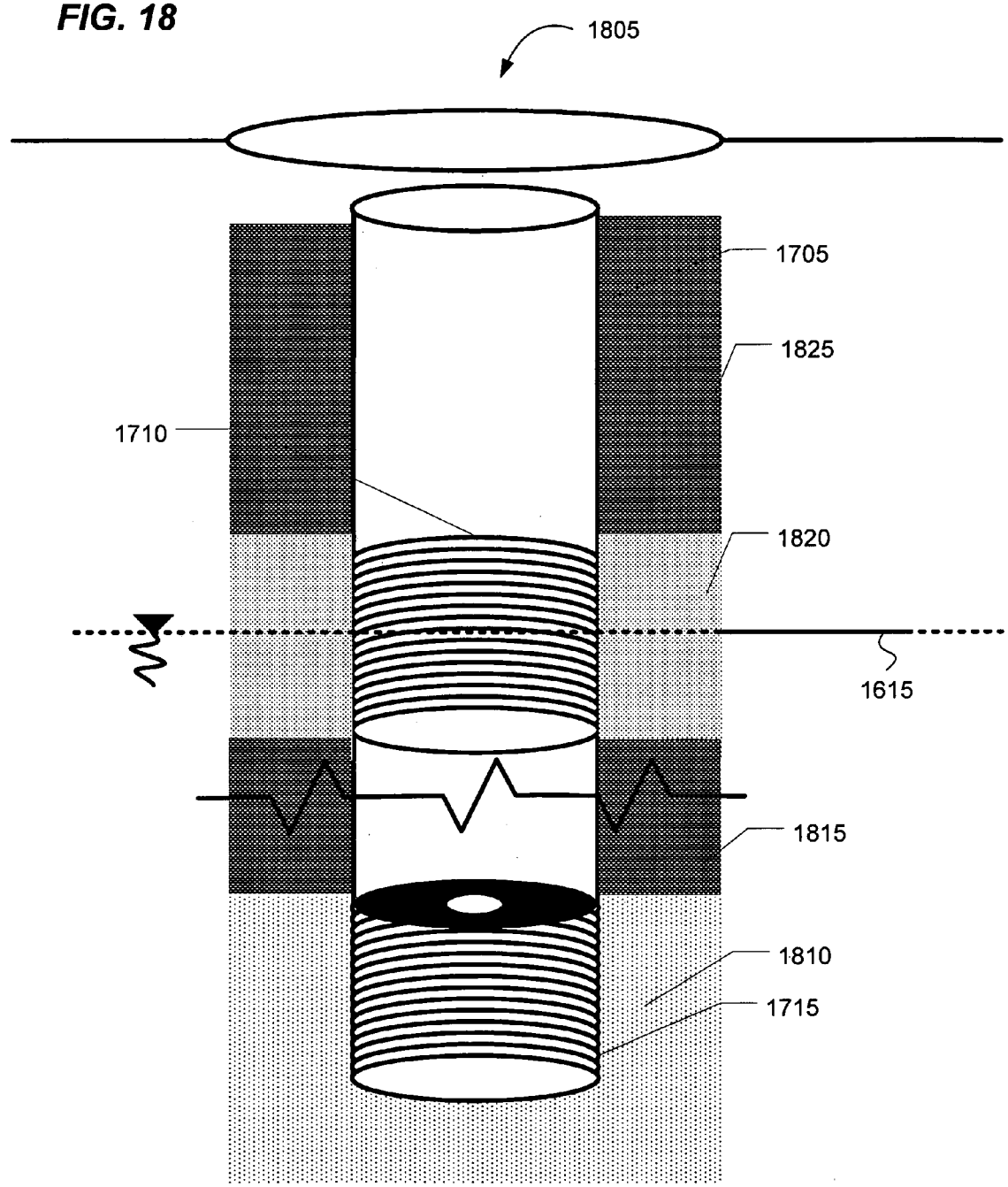

Turning to FIG. 18, the well casing 1605 (not shown) has been removed from the well 1805. In various layers, material is placed between the preassembled chamber 1705 and its environment. Hydraulically conductive material 1810 is placed at the bottom of the well 1805. The hydraulically conductive material 1810 may comprise coarse sand (e.g., such as 8/12 Colorado sand), pea gravel, or any other material through which fluid will readily flow.

Around the inlet screen 1710, very fine sand or material is packed around the preassembled chamber 1705 forming a screening layer 1820. The very find sand may comprise 20/40 Colorado "sugar" sand or a functionally equivalent material. The very fine sand traps fines in fluid that attempts to enter the inlet screen 1710. Keeping the fines from entering the preassembled chamber 1705 helps to keep the preassembled chamber 1705 and other components (not shown) of the system unclogged.

In addition, the well 1825 should be well-developed. A well-developed well is a well that has had all or a great percentage of the interstitial fines removed from the immediate vicinity of the well. Interstitial refers to the space between the grains that comprise a material. Fines refer to very small particles that may be transported interstitially. Removing the fines from the immediate vicinity of the well helps to keep the well from clogging up when the well is used in decontamination of the area surrounding the well. Removing the fines also aids in providing good hydraulic communication of the fluid through the formation surrounding the well, through the very fine sand, and into the inlet screen 1710.

Bentonite chips may be placed on top of the hydraulically conductive material 1810 to form a fluid-impermeable layer 1815. The fluid-impermeable layer 1815 stops fluid from short-circuiting from the outlet screen 1715 to the inlet screen 1710 through the well 1805. Rather, the fluid is forced to enter the environment surrounding the well 1805 before returning to the inlet screen 1710. Bentonite chips below the average water surface level 1615 will naturally hydrate as the water causes them to expand. As they hydrate, the bentonite chips form a tight seal.

Another fluid-impermeable layer 1825 is formed above the screening layer 1820. It will be understood that fluid-impermeable layer 1825 may be formed by using bentonite chips and hydrating them or through the use of some other material.

Turning to FIG. 19, a unit 1905 is constructed to fit inside the preassembled chamber 1705 of FIG. 17. The unit 1905 comprises a gas line out 1907, a top 1910 that may be sealed or open depending on the application. With a vacuum, the top 1910 is typically sealed. This is helpful as described earlier. Some valve control wires 1915 extend to a valve 1920. Although the valve is shown at a relatively low elevation in the down-and-out-tube 1930, ideally the valve is located at a higher elevation (e.g., above the gasket 1970) in the down-and-out-tube 1930 to minimize the fluid in the down-and-out tube 1930 that is not treated when the valve 1920 is closed.

The valve 1920 may close for a time to stop fluid from exiting the unit 1905 until volatile components have been stripped out. Determining when volatile components have been stripped may be accomplished by an apparatus (not shown) connected to the gas line out 1910 that measures the level of the volatile components exiting the unit 1905. The apparatus may comprise a photo ionization detector (or some other mechanism) to detect the level of volatile components in the gas exiting the unit 1905 through the gas line out 1907. When the level of the volatile components is high, the apparatus may send signals to cause the valve 1920 to close. Closing the valve 1920 stops the follow of fluid through the system and allows more gas to come in contact with the fluid already in the unit 1905. The gas continues to strip the contaminates from the fluid contained in the unit 1905 until the level of the volatile components reaches a selected level. Then, the apparatus may send signals to cause the valve 1920 to open which allows fluid to resume flowing through the unit. It will be understood that early in a decontamination process that the valve may close more frequently because of the typically higher-level of volatile contaminates in the fluid, but that as time goes on that the valve may close less and less frequently or may remain open as volatile components have been mostly removed from the surrounding environment.

The outer wall 1925 of the unit 1905 may be formed by any fluid-impermeable material. In one embodiment of the invention, the other wall 1925 is formed by an 11 inch diameter schedule 40 steel tube.

A down-and-out tube 1930 may comprise several sections and may have a beveled lower piece 1935 for ease of insertion into the preassembled chamber 1705. Sections of the down-and-out tube 1930 may be held in place by internal bracing members 1940 and 1941. Alternatively, a plate (not shown) may be welded to the bottom of the unit 1905 that holds the down-and-out tube 1930. In this alternative, one way valves (not shown) may be inserted to cause fluid to flow in one direction only.

An upper section of the down-and-out tube 1930 may include a float 1960 that keeps the top of the down-and-out tube 1930 at the surface of the gas/fluid mixture contained in the unit 1905. The float 1960 may be attached to the top, telescoping end of the down-and-out tube 1930. The float 1960 may be constructed such that the top, intake end (hereinafter "the inlet") of the down-and-out tube 1930 remains at or near the top of the gas/liquid mixture in the gas-lift passage of the unit 1905. The float 1960 allows for automatic compensation and adjustments as conditions change. The float 1960 causes the inlet to lower when the surrounding fluid level drops and to rise when the surrounding fluid level rises thus generating more downward pressure into the environment surrounding the apparatus. Thus, the rate at which the environment surrounding the apparatus yields fluid to the unit 1905 will be automatically balanced with the rate at which the treated fluid is pushed back down into the environment. It will be recognized that keeping the top section of the down-and-out tube 1930 at the surface of the gas/fluid mixture maintains the maximum amount of pressure for injecting the fluid down through the down-and-out tube 1930 into the environment.

Alternatively or in addition to a float, the height of the top of the down-and-out tube 1930 may be controlled by a cable (not shown) attached to the top of the down-and-tube 1930. By lowering the height of the top of the down-and-out tube 1930, a larger volume of fluid may enter the system. By raising the height of the top of the down-and-out tube 1930, less fluid will enter, but a taller column of water may be generated, which may in turn exert greater downward pressure.

Furthermore, gas flow into the gas-lift chamber may be adjusted via a valve, a pump that can dynamically change its pressure, or otherwise. Adjusting the gas flow affects how much fluid is pulled into the unit 1905, from the surrounding groundwater table. It will be understood that by adjusting these two parameters (i.e., the height of the top of the down-and-out tube 1930 and the amount of gas flow into the unit 1905) that the fluid flow through the unit and the pressure with which the fluid/gas mixture is returned to the environment through the down-and-out tube 1930 may be controlled.

Slots 1965 at the upper section of the down-and-out tube 1930 may provide an inlet for the fluid in the unit to enter the down-and-out tube 1930. Slots 1965 may comprise slot, holes, or any other apertures that allow fluid to enter the down-and-out tube 1930. A slip joint 1980 may provide a mechanism by which the upper section of the down-and-out tube may slide up and down as the surface of the gas/fluid mixture contained in the unit 1905 changes. Ideally, the slip joint 1980 is constructed to allow easy movement of the upper section of the down-and-out tube 1930 while not allowing any fluid or gas to enter the down-and-out tube 1930 at the slip joint 1980. The length of the upper section of the down-and-out tube 1930 may be determined to suit the expected variations of elevation of the gas/fluid mixture in the unit 1905.

A gas line 1945 may connect to a gas emitter 1950 to provide gas to create rising bubbles in the unit 1905. The gas line 1945 may come through the side, top, or up through unit 1905 to the gas emitter 1950 without departing from the spirit or scope of the invention. Preferably, the gas emitter 1950 is shaped as a doughnut shape that encircles the down-and-out tube 1930. This may be done to evenly disperse bubbles throughout a cross-sectional area of the unit 1905 and to minimize the possibility of downward currents in the gas-lift passage.

A retrieval cable 1955 may connect to the unit 1905 to provide for easy removal of the unit 1905 from the preassembled chamber 1705.

The bottom part of the unit 1905 is designed to sit on the plate 1720 of the preassembled chamber 1705 of FIG. 17. The bottom part of the unit 1905 may comprise intake holes and bottom supports 1975. When functioning in a complete system, fluid may enter through the intake holes and bottom support 1975 by traveling between the unit 1905 and the preassembled chamber 1705. A gasket 1970 mates with the center hole of the plate 1720 of the preassembled chamber 1705 of FIG. 17. This mating causes a seal so that fluid may only travel below the plate through the down-and-out tube 1930.

Figure 20:
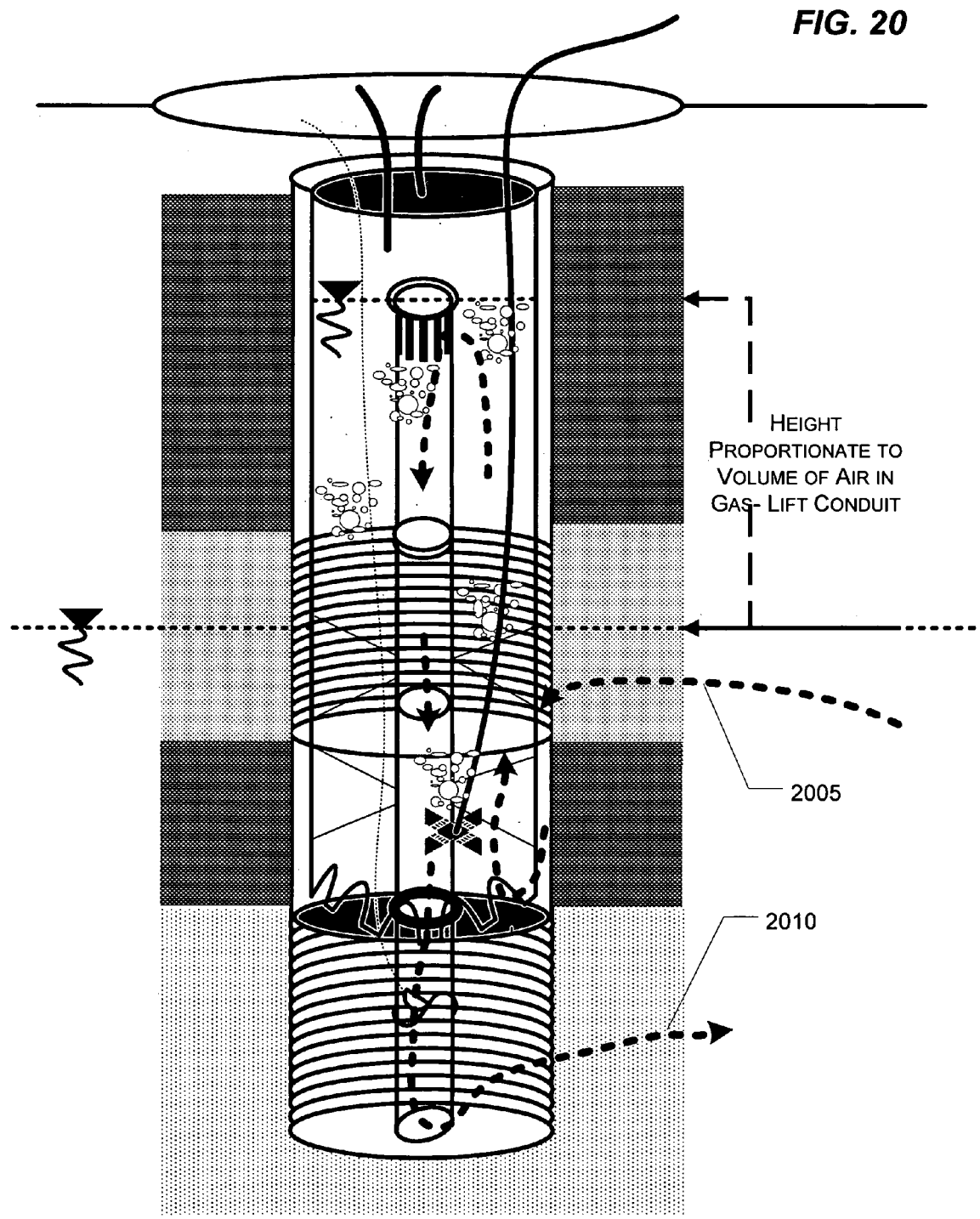

Turning to FIG. 20, the unit 1905 of FIG. 19 has been inserted into the preassembled chamber 1705 of FIG. 18. Fluid flows into the system from the environment at and around point 2005. The fluid flows through the very fine sand, through the inlet screen, down through the gap between the preassembled chamber and the unit, up in the unit, down in the down-and-out tube, and out into the environment at and around point 2010.

To assist in alleviating problems caused by iron that is dissolved in the fluid, various modifications may be made. Dissolved iron found in the fluid has a potential for clogging the apparatus and system described above. For example, iron may accumulate on the plate (e.g., plate 1720 of FIG. 17) and block the intake holes (e.g., intake holes 1975 of FIG. 19). To prevent this, a filter may be placed on or slightly above the plate before the fluid enters the gas lift chamber. In another embodiment of the invention, a filter may be wrapped around the unit (e.g., unit 1905 of FIG. 19), thus filtering the iron out before it gets to the plate. In another embodiment of the invention, the plate may be formed in a conical shape (like a bowl face up) to catch the iron. A filter may be placed in the down-and-out tube to filter iron so that iron is not introduced into the surrounding environment. In each modification described above, periodically, the unit may be removed to clean or replace the filter and/or clean the plate.

In addition or alternatively, carbon dioxide may be introduced in the gas to keep the iron in suspension. The pH level may be lowered. A bio-fouling agent may be introduced which kills any iron-fixing bacteria in the environment. It will be understood that many other techniques for stopping or reducing the amount of iron accumulating in the apparatus and system may be used without departing from the spirit or scope of the invention.

Figure 21:
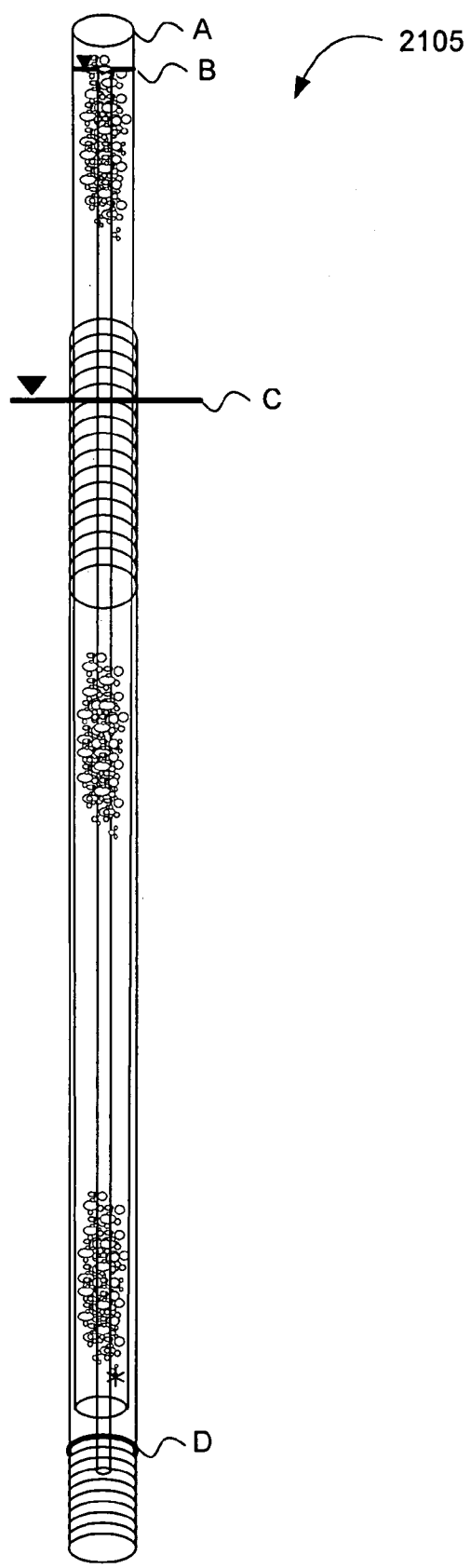

Turning to FIG. 21, a mostly-to-scale drawing is shown of an apparatus that includes the preassembled chamber 1705 of FIG. 18 connected with the unit 1905 of FIG. 19 (hereinafter together referred to as "the combined apparatus" 2105) inserted therein. The combined apparatus 2105 is 20 feet from point B to point D, 12 inches in diameter for the outer casing, and 10 inches for the inner unit (unit 1905). In this embodiment, schedule 40 steel tubing is used with each of a 12 inch (diameter) outer casing, a 10 inch (diameter) gas-lift tube, and a 4 inch (diameter) down-and-out tube. If the cross sectional area of the 4 inch down-and-out tube is subtracted from the cross sectional area of the 10 inch gas-lift tube, this gives the cross sectional area available for lifting fluid in the gas-lift tube. Multiplying this cross sectional area by the height of the combined apparatus provides the net volume of the gas-lift tube. In this embodiment, the net volume of the gas-lift tube is 65.4 gallons. This volume is available for the treatment of fluid.

If the average bubble that is emitted is 0.20 millimeters, then the average rising velocity is approximately 0.16 meters/second. With an average emitted bubble size of 1 millimeter, the average rising velocity is 0.25 meters/second. Assume that the bubbles rise faster than the fluid within the gas-lift tube. Assume that the distance between the bottom of the gas lift tube (point D) and the water level of the surrounding environment (point C) is a constant of 15 feet. Furthermore, assume that the formation of the environment yields and receives an essentially frictionless flow of fluid. Furthermore, assume that the top intake of the down-and-out tube remains at point B which is 5 feet above the water level of the surrounding environment. Furthermore, if the fluid rises at ¾ of the velocity of the bubbles, then the following approximate results are obtained:

Bubble transit time from point D to point B is 0.635 minutes=38.1 seconds (=6.1 meters [i.e., 20 feet]/0.16 m/s).

Groundwater transit time from point D to point B is 0.85 min (=0.635 min./0.75)

The gas/fluid mixture in the gas-lift tube is no more than ¾ part fluid and no less than ¼ part gas The volume of fluid in the gas-lift tube is approximately 49 gallons (65.4×¾) which can be conservatively approximated to 45 gallons The flow rate through the combined apparatus is 53 gallons per minute (gpm) (=45 gallons/0.85 min)

A gas injection rate of 20.4 gpm (65.4–45)–2.7 cubic feet per minute @ 7 pounds per square inch (psi) is required Thus, according to the description above, and aspects of the present invention, the fluid flow remediation system includes three water conduits. The conduits may be concentric, adjacent vertically or spatially separated. The first and/or outer conduit will convey groundwater from at, or immediately below, the groundwater's surface to the bottom of the device. Water then passes from the first conduit into the second, now moving up instead of down. The second water conduit also has air supplied to it, at or near its bottom. The rising air will then lift the water up through the second tube by both the pushing action of upwelling bubbles and the resultant density difference between air entrained water and the denser water of the first conduit. At the top of the second, air-lift conduit, the air is allowed to separate from the water and leave the device, for possible further treatment and/or recycling. Now the water passes into the third and final conduit, again making a U-turn, where it exits down the device and out, to the bottom of the well.

The first conduit allows groundwater to enter such that, when situated in the well, the screen's height will allow water to enter during the highest to the lowest groundwater elevations, similar to the top well screen. The third conduit, i.e., the down and out conduit, is screened to the same bottom elevation as the first tube and top well screen, but its top openings will be higher to facilitate the air-lifted water in the second conduit or chamber 630. These screening widths allow for continuous groundwater flow, for predicted groundwater elevation fluctuations.

The decontamination system thus may remediate groundwater and surrounding soils through methods, including:

1. Introducing oxygenated water to the bottom of the well and out into the surrounding environment promotes biological activity and helps to volatize contaminants;

2. The rising air bubbles in the second conduit create an in-well air stripper, transferring contaminants from the liquid to the vapor phase;

3. The resulting convection currents push and pull groundwater up toward the top of the device, helping to contract the plume;

4. The upward and inward currents also flush the surrounding soils, accelerating contaminant desorption and/or detachment; and 5. Introduction of gas phase oxidants (or reductants), e.g. ozone, may accelerate contamination remediation.

This design can also be configured to work in conjunction with existing, or new, conventional air-sparge remediation systems, adding the last three listed benefits to the first.

Potential problems associated with iron fouling may be addressed by incorporating $CO_2$ into the air's intake, depressing the pH and keeping the iron in solution, depending on the alkalinity and buffering capacity of the groundwater and soil.

According to aspects of the present invention, the fluid flow system and methods as described above and as applied to a remediation system can also be used in the following applications:

Pneumatic Pump

Figure 7:
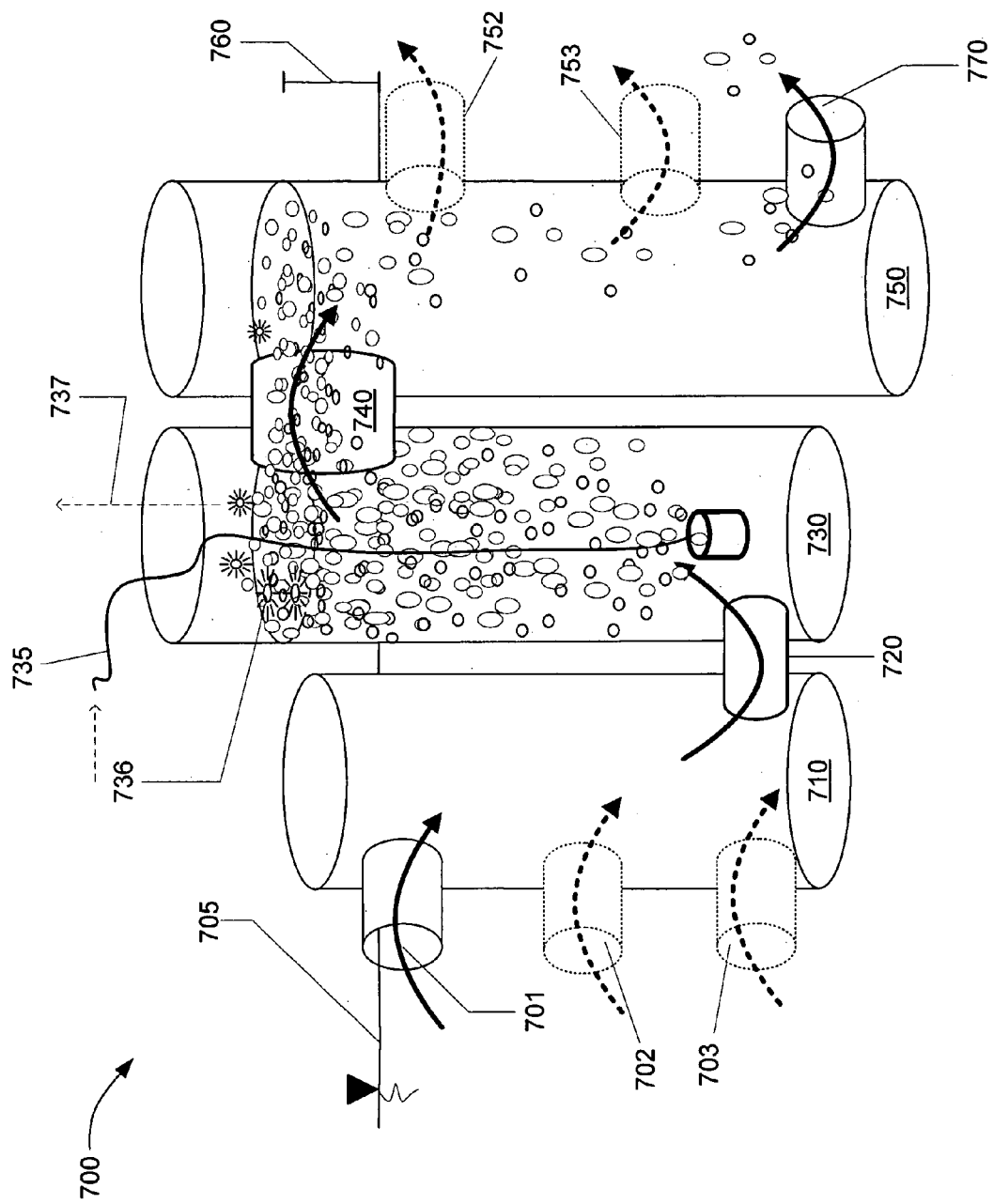
FIG. 7 illustrates a pneumatic pump in accordance with an aspect of the invention.

FIG. 7 shows an illustration of a pneumatic pump, according to one embodiment of the invention. Gas bubbles in the gas-lift conduit can be sized for specific applications; smaller bubbles facilitate gas transfer, while larger bubbles create greater density differences.

Line 705 depicts the static fluid level. In one embodiment of the invention, one entry port is included. In other embodiments of the invention, multiple intake ports are included: When a single intake port is included, the intake port is positioned at an intake level desired. When multiple intake ports are included, one or more of the intake ports may be selected to collect fluid from the environment. The selected intake ports may then be opened, uncapped, or unblocked, while the non-selected intake ports may be closed, capped, or blocked to prevent fluid flow. What intake port or ports are selected depends on the requirements of a particular system. In system 700, fluid from the environment enters through entry port 701. Entry ports 702 and 703 are closed.

It will be recognized that when unsealed the bottoms of passages 710 and 730 may also be used as intake ports. To prevent fluid from being collected from the bottoms of chambers 710 and 730, the bottoms may be sealed.

A first chamber 710 is in fluid communication with a second chamber 730 through a bottom conduit 720. Gas enters chamber 730 through line 735. Preferably, gas is emitted into chamber at or near the bottom of chamber 730. The gas travels through the mixture and exits the fluid at fluid/gas interface 736 and leaves the pump through opening 737. The second chamber 730 is in fluid communication with a third chamber 750 through the upper conduit 740.

At 770, the fluid exits the pump out an exit portal. In one embodiment of the invention, one exit portal is included. In other embodiments of the invention, multiple exit portals are included. When a single exit portal is included, the exit portal is positioned at an exit level desired. When multiple exit portals are included, one or more of the exit portals may be selected for allowing fluid to enter into the environment. The selected exit portals may then be opened, uncapped, or unblocked, while the non-selected exit portals may be closed, capped, or blocked to prevent fluid flow. What exit portal or portals are selected depends on the requirements of a particular system.

In system 700, fluid exits the third chamber 750 through exit portal 751. Exit portals 752 and 753 are alternative exit paths that are closed in one embodiment of system 700. Differential fluid level 760 depicts the additional height the fluid is raised above the static fluid level 705. Differential fluid level 760 is proportionate to the volume of gas traveling through the fluid. The flow velocity and or volume generated are also directly proportionate to this height.

Hypolimnetic Aeration

Figure 8:
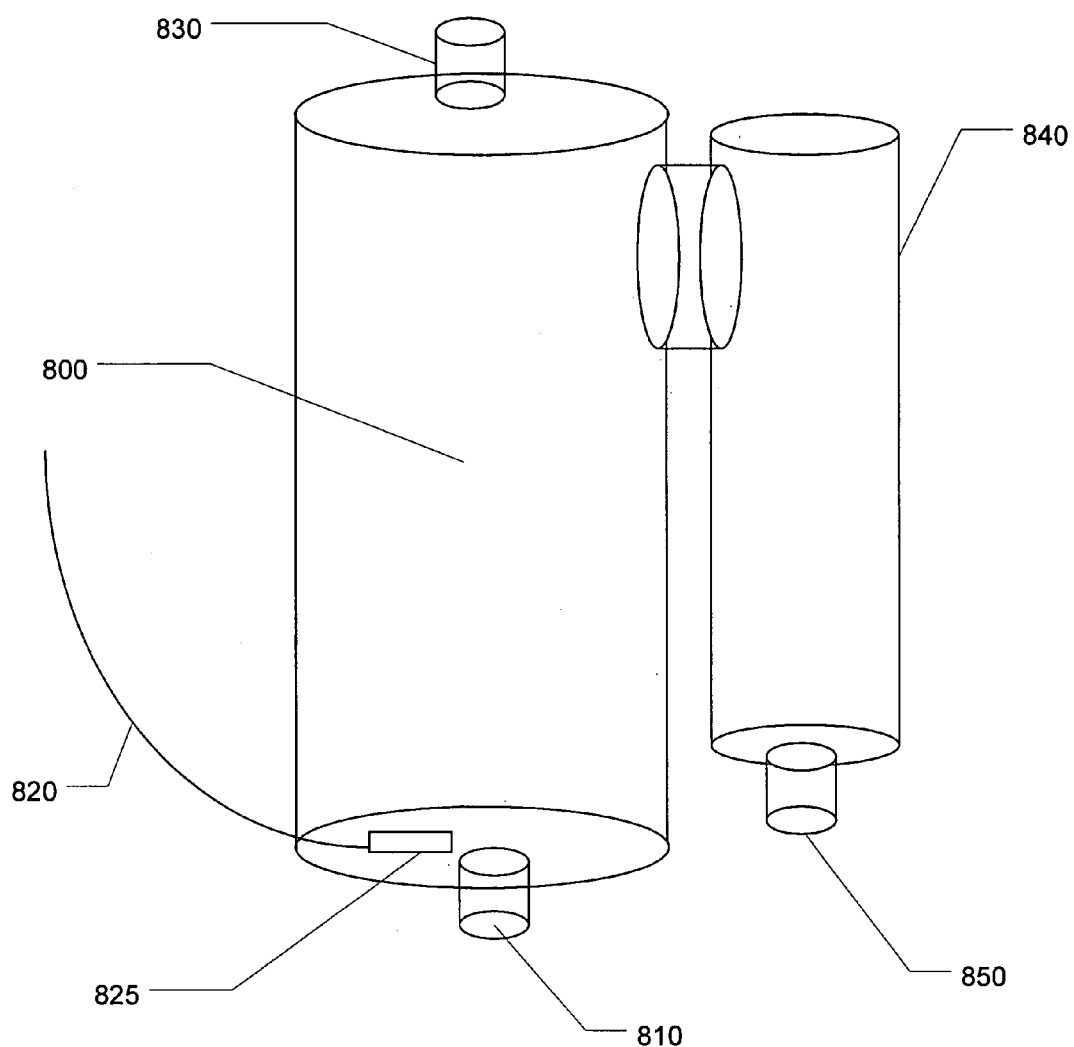
FIG. 8 illustrates an embodiment of the invention that may be used to oxygenate water in a lake or pond.

FIG. 8 shows an embodiment of the invention that may be used to oxygenate water in a lake or pond. This embodiment facilitates aeration of lower (anoxic) thermally stratified layers in lakes and oxygen deficient ponds by creating downward fluid flow of oxygenated water.

Deeper bodies of water have the coldest, densest water settle at the bottom, where little mixing occurs and biological demands deplete oxygen levels. These lower levels then become inaccessible to oxygen-requiring species. Alternatively, many ponds have elevated levels of nutrients, which in turn, foster oxygen depleting algae blooms. To remedy these conditions, hypolimnetic aeration may be employed by pumping bottom water to a surface fountain spray. This method of elevating levels of dissolved oxygen, however, requires high capital, maintenance, and energy costs The deeper the water, the longer a fluid flow can be in the gas-lift passage. Longer passage extends air/water contact time, which maximizes oxygen air to water transfer. By placing an inlet conduit at the bottom of a gas-lift conduit (or eliminating it altogether), water is brought into immediate contact with the rising air bubbles. Alternatively, the inlet passage might extend to the bottom of the lake, drawing the water with the lowest level of dissolved oxygen and moving it upward to a more convenient location. Regardless of the intake configuration, the fluid flow system design of the present invention can be employed to both increase air bubble/water contact time and return the oxygenated water to a more oxygen-depleted region.

In a lake or large pond, there may be a relatively large volume of water to be aerated. To sufficiently aerate the water, the size of gas lift passage 805 may be increased appropriately. Water enters gas lift passage 805 through inlet 810. Water may be drawn from the anoxic depths of the body of water through an intake conduit/hose (not shown) attached to the bottom of gas lift passage 800. Pressurized air is supplied through one or more appropriately sized lines 820. Air diffuser 825 may be mounted directly on the bottom of the gas lift passage. The gas leaves the aeration device at the top of the gas lift passage through a gas exit portal 830. Down and out passage 840 is the passage through which water is returned. Down and out passage 840 may be a separate passage (as shown) or simply a fluid connection near the top of the gas lift passage. Whether down and out passage 840 is a separate passage or a fluid connection depends on where one desires to return the aerated water. Exit portal 850 provides an opening through which aerated water passes to return to the lake or pond. It will be recognized that the length of down and out passage 840 may be adjusted to return water at any given level without departing from the spirit or scope of the invention.

System 800 has many advantages over conventional pump-and-spray methods hypolimnetic aeration, including:

1. It can be configured with no moving parts to corrode or short in the water;

2. The natural aesthetics of the environment can be maintained;

3. Pushing air into water to create the fluid flow is considerably more energy efficient than pulling water to the surface and spraying it up into the air; and 4. Whereas fountains return oxygenated water to the surface where the aerated water is needed the least, system 800 may be configured to return the water to a selected location, such as closer to the bottom of a body of water where there is little oxygen.

Aquarium Surface Skimmer and Current Generator

Figure 9:
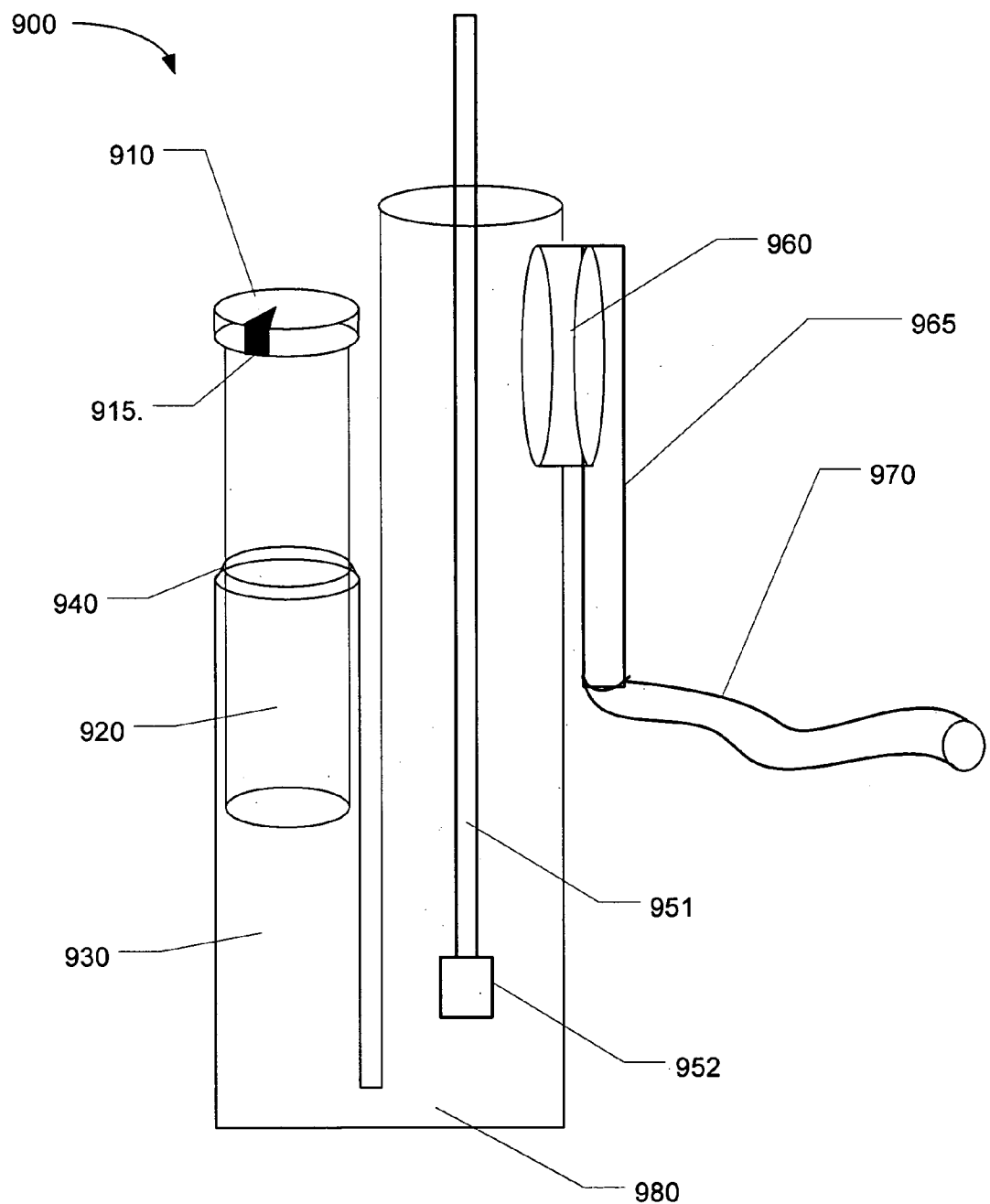
FIG. 9 illustrates an embodiment of the invention that may be used in an aquarium.

FIG. 9 shows an embodiment of the invention that may be used in an aquarium. System 900 includes, among other things, an inlet 915 and a down and out conduit 965. The inlet 915 functions as a surface skimmer, while down and out conduit 965 can be configured to create a sideways, in-tank current.

Traditional under-gravel filters pull water up with an air stone in a tube. Instead of having the inlet passage connect to an under-gravel elevated screen, however, the inlet passage of system 900 floats at the surface, acting as a surface skimmer. Surface skimmers act to pull insoluble floating debris that will otherwise accumulate. Once re-suspended in the water, the wax-like platelets can be removed through existing filters. Instead of having the air-lifted water spill out randomly at the surface, where the water already has the highest level of naturally occurring oxygen levels, the now flexible down and out tube can be strategically located to both oxygenate lower levels of the aquarium and create a current.

Intake passage 930 consists of two telescoping tubes, whose overlap 920 is sufficient to encompass anticipated water levels. The top intake has a notch 915 to focus flow from the surface only. The notch is held on the surface by a float 910 attached to the intake tube. The point of contact 940 between the two tubes is relatively water-tight, but loose enough to allow up and down movement of the inner intake tube when adjusting to fluctuating water levels in the tank. The gas lift passage 950 has air supplied to it by an air line 951 equipped with an air stone emitter 952 at or near the bottom of gas lift passage 960. The down and out passage 965 is herein also depicted as spatially separated and in fluid communication with the gas lift passage at 960. The down and out passage may be connected to a semi-rigid tube 970 which can be bent and positioned such that in-tank flows are generated where desired.

The unit may be constructed of a material with sufficient density to preclude its loosing a vertical orientation during operation, may be affixed to the tank's glass walls with suction cups, and/or may be weighted at the bottom.

In this embodiment, optimal flows may be achieved with a vertical orientation of the gas lift passage 960. Other orientation are contemplated and within the spirit and scope of the invention, but should be used when a less than optimal flow is allowable, e.g. to satisfy aesthetic requirements or otherwise. It should be understood that an orientation other than vertical will cause the rising bubbles to congregate on the upper inside edge. In an orientation other than vertical, a density difference will still be created and flows will still be generated, but the system will not operate as efficiently as a strictly vertical orientation. This is because a uniform cross-section of rising gas pockets (as happens in a vertical orientation) tends to lessen inside passage counter currents.

While not necessarily a replacement, system 900 has many advantages over conventional aquarium systems, including:

1. The ability to skim the surface;
2. The elevation of dissolved oxygen levels;
3. The ability to strategically place the return of oxygenated water (and its associated current); and
4. The ability to use existing aquarium air pumps.

Wastewater Treatment

Figure 10:
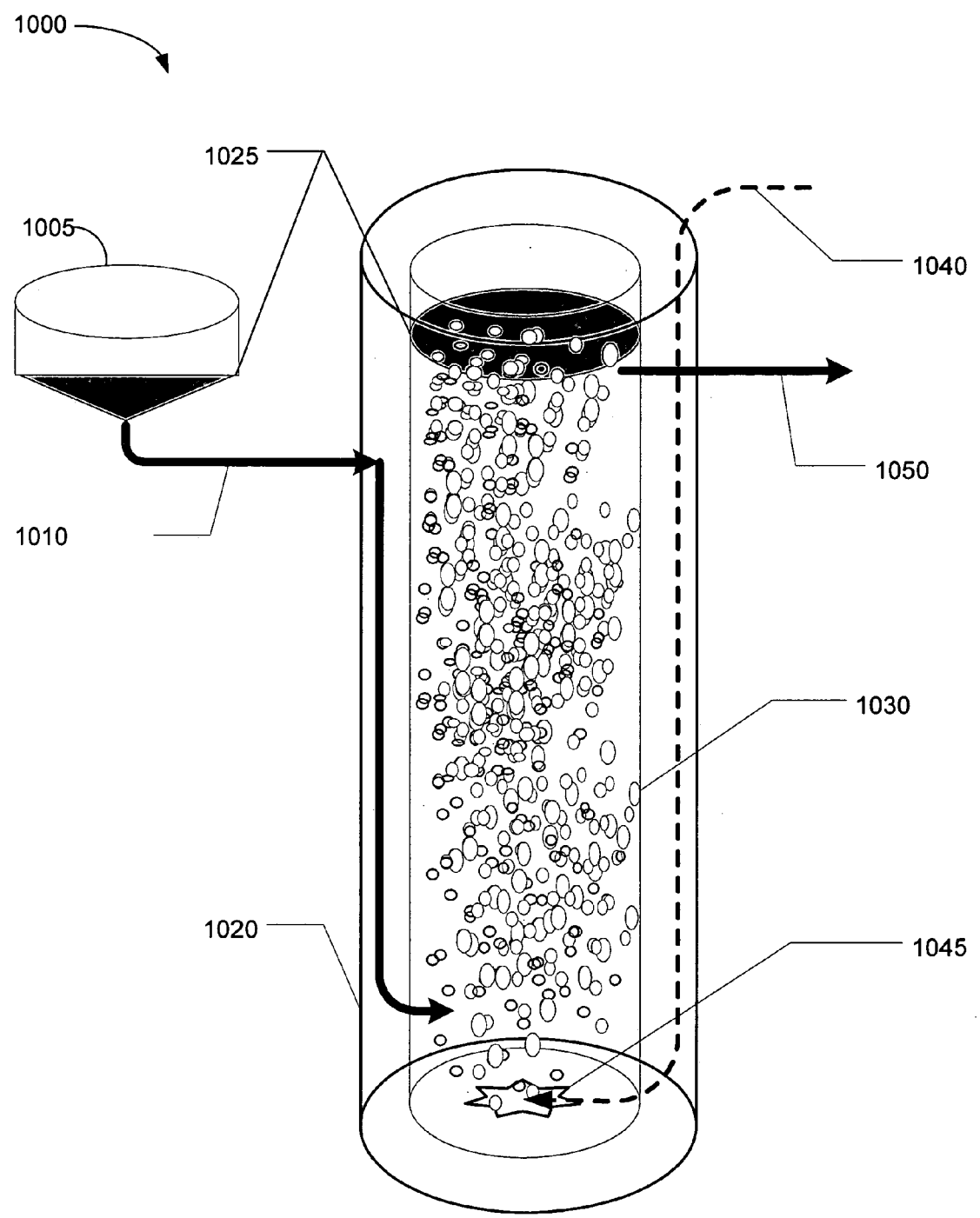
FIG. 10 illustrates an embodiment of the invention that may be employed in wastewater treatment.

FIG. 10 shows an embodiment of the invention that may be employed in wastewater treatment. System 1000 as shown in FIG. 10 lends itself to aeration, mixing, and fluid transfer during wastewater treatment, especially applicable in waste activated sludge (WAS) processes.

Bacterial decomposition of the majority of constituents found in wastewater (residential, industrial, or agricultural) results in the depletion of levels of dissolved oxygen. Untreated releases of wastewaters can create waters with levels of dissolved oxygen so low as to be toxic. Therefore, a design consideration in biological treatment of wastewater is to provide $O_2$ to bacteria, prior to release. In one embodiment of system 1000, this is done without any moving parts in the wastewater to be treated. In other embodiments of the system, moving parts may be combined with system 1000 to treat the wastewater.

Almost universally in the United States, larger municipalities utilize WAS systems in an attempt to minimize land requirements. Unfortunately WAS systems require high energy inputs. The basic idea is to mix very high concentrations of bacteria with the wastewater in large holding tanks that have large volumes of air passing up from the bottom.

The high pressure diffusers emit air which passes directly from the bottom to the top of the tank. Extending the contact time with the air (as described in the present invention) improves the gas to liquid transfer of oxygen. System 1000's fluid flow design extends this contact time a duration which is proportionate to the additional elevation gained in the gas lift passage (which in turn is proportionate to the volume of gas passing through the liquid).

Selecting appropriate fluid entry and exit points facilitates greater mixing and helps eliminate stagnate region in the tanks. Not only could these benefits be derived with little or no additional energy requirements, but with the prolonged contact time less air would need to be injected to achieve the same net rate of oxygen transfer. By collecting and treating the gas exiting from the gas lift passage, greater odor control is possible.

In conventional wastewater treatment facilities, transfer of sediments and settled sludge between unit processes is another major energy drain. System 1000 may be used for pumping between tanks with the benefits of lower energy costs, no moving parts being abraded by sediments, and additional aeration during transfer.

System 1000 has an intake 1005 in fluid communication with the sediments collected from a primary or secondary clarifier 1010. The entire unit may be located in a large, deep dry well 1020 to provide for a significant travel time of the air through the sludge and a significant volume for a head generating height differential 1025.

The gas lift passage 1030 is sized to conform with the dimensions of the dry well, again to increase contact time and entrained air volume.

Pressurized air is supplied through line or lines 1040 and emitted through a diffuser 1045 at or near the bottom of gas lift passage 1030. The down and out passage 1050 is a conduit to the next unit process.

Well designed wastewater treatment plants are largely gravity flow, with minimal pressure head requirements. Head could be increased by inserting system 1000 in dry wells, strategically located between unit processes. By creating a longer gas lift passage inside the dry well, more air can pass through the liquid before exiting out the top. The more air in the wastewater, the greater the height differential between the intake level and the exit level.

Fluid Lift System

Figure 12:
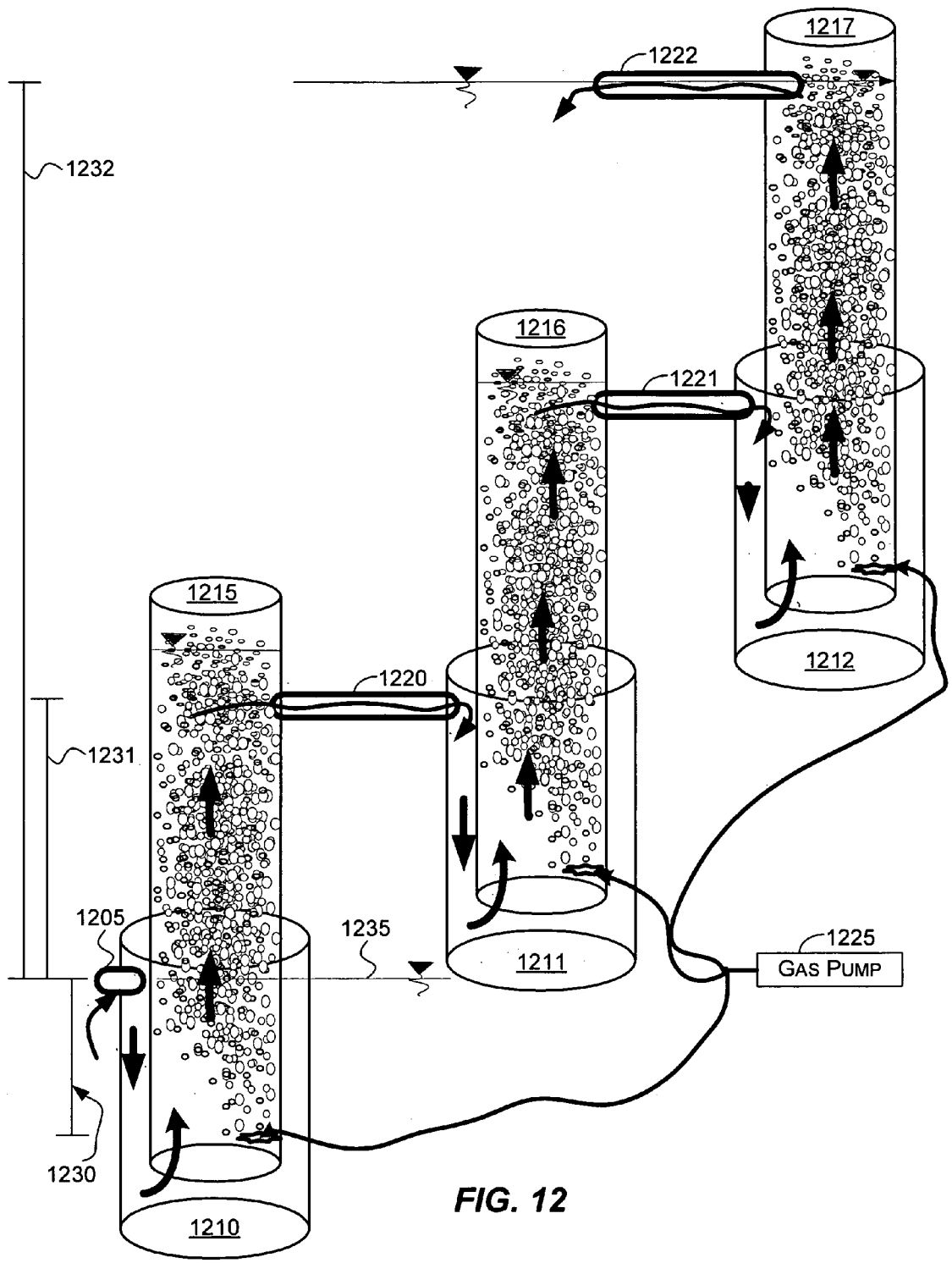
FIG. 12 shows an embodiment of the invention that may be employed to raise a fluid through successive stages.

FIG. 12 shows an embodiment of the invention that may be employed to raise a fluid through successive stages. Fluid enters the system at intake port 1205, which is positioned so as to extend a range including expected high and low fluid levels and account for drawdown created by the fluid flow. The fluid flows down through chamber 1210 and up through chamber 1215. The fluid flows out of chamber 1215 through conduit 1220 to chamber 1211. In chamber 1211, the fluid again flows down and then up through chamber 1216. The fluid flows out of chamber 1216 through conduit 1221 to chamber 1212. The fluid flows down in chamber 1212 and up through chamber 1217. The fluid then exits chamber 1217 through conduit 1222. The flow of the fluid is established by gas that is injected into each of the chambers 1215–1217 by a gas pump 1225.

Each of the chambers 1215–1217 is analogous to the conduit 550 of FIG. 5 or the chamber 630 of FIG. 6 and may be configured accordingly with or without off-gas exit portals. Each of the chambers 1210–1212 is analogous to the conduit 540 and may be sealed or unsealed at the top or may extend higher without departing from the spirit or scope of the invention.

By injecting a sufficient rate of gas, the head of fluid entering into each of the chambers 1210–1212 may be used to lift fluid a selected height. Each stage can raise fluid in proportion to the amount of gas that is injected into the gas-lift chamber and entrained in the fluid. For example, if the head of each of the chambers 1210–1212 is 5 feet (e.g., difference 1230), with a sufficient rate of gas injection, the chambers 1215–1217 may each raise the fluid 10 feet (e.g., difference 1231) to a total of 30 feet (e.g., difference 1232) from the original fluid level 1235. This rate of gas injection would cause the gas/fluid mixture in each of the chambers 1215–1217 to be ⅓ fluid and ⅔ gas. The rate of gas injection is calibrated to overcome the head desired and associated friction.

The system shown has the feature of improving the fluid flow rate compared to the gas injected when compared to a single stage system. For example, a single stage system lifting fluid via the mechanism shown in FIG. 12 may require approximately twice the gas while halving the fluid flow rate as the three stage system shown in FIG. 12.

It will be recognized that the systems shown in FIG. 12 may have fewer or more stages without departing from the spirit or scope of the invention. The system shown in FIG. 12 may be used to lift a variety of fluids, depending on the needs of the application, without departing from the spirit or scope of the invention.

Figure 15:
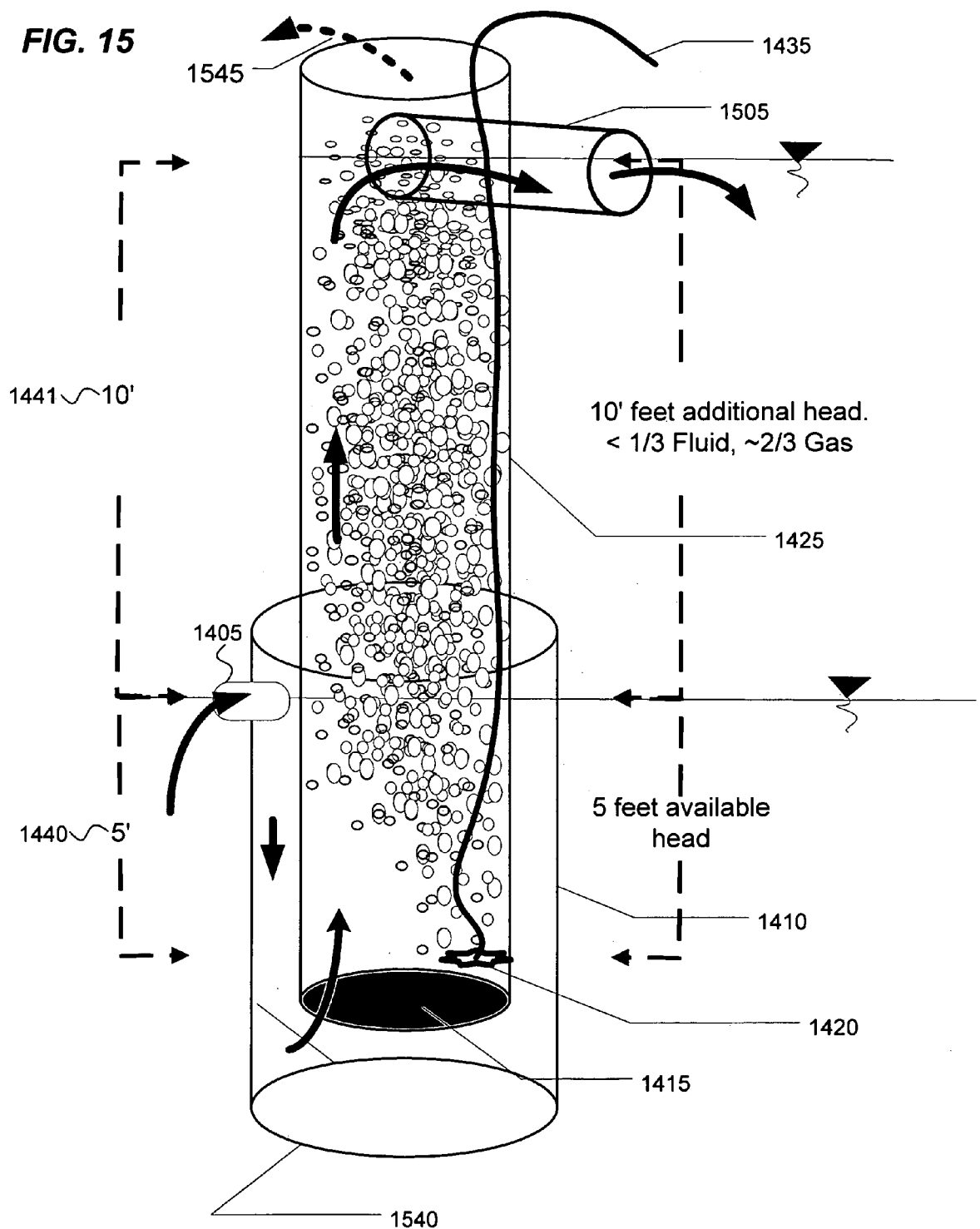
FIG. 15 shows a one stage embodiment of the invention for raising a fluid in accordance with various aspects of the invention.

FIG. 15 shows a one stage embodiment of the invention for raising a fluid in accordance with various aspects of the invention. The apparatus includes an intake port 1405, an intake chamber 1410, a one way valve 1415, a gas emitter 1420, a gas lift chamber 1425, an exit port 1505, and a gas supply line 1435. The intake chamber 1410 is sealed at the bottom 1540. Elements of the apparatus that have element numbers identical to those found in FIG. 14 operate in a manner similar to that described in conjunction with FIG. 14. Fluid elevated to the top of the gas lift chamber 1415 exits through exit port 1505 while gas may exit through the top 1545 of the gas lift chamber 1425. The top 1545 may be open or have a gas exit port for allowing gas to escape.

In operation, the apparatus elevates fluid above the level of the intake port based on the amount of gas injected into the system and the difference 1440. In the embodiment shown in FIG. 15, this elevation is 10 feet and is due to the difference 1440 of 5 feet in combination with the mixture of gas and fluid in the gas lift chamber of ⅓ fluid and ⅔ gas. It will be recognized that by varying the difference 1440 and the amount of gas injected, other differences 1441 may be obtained in accordance with principles of the present invention.

The fluid elevation mechanisms described in conjunction with FIGS. 12 and 15 may be used for variety of fluids. In water treatment of purification application, the gas may comprise ozone, chlorine, bromine, or some other water treatment substance. It will be recognized that the fluid elevation mechanisms described in conjunction with FIGS. 12 and 15 may be particularly advantageous for creating a source of potable water as they may raise the water above the ground level. Introduction of ozone (or other disinfectants) may allow the device to lift water and sterilize simultaneously. Of course, other applications of the fluid lift mechanism not involving potable water may also be applied without departing from the spirit or scope of the present invention.

Other Applications and Embodiments of the Invention

In addition to the applications above, embodiments of the invention may also be used in the following applications:

Expediting Chemical Mixing and/or Reactions. One embodiment of a system configured in accordance with the invention moves less dense fluids from the top of reaction chamber to desired level. Gas can be used as an inert mixer, reactant, or used to strip out components. Controlling the gas's temperature may also benefit process reaction rates.

Food Processing: One embodiment of a system configured in accordance with the invention facilitates food processing where introducing or stripping out a gas is desired. In addition, or alternatively, the system may also be used to facilitate mixing. Maintaining specific injection gas temperature can provide additional process control.

One example of an embodiment of the invention configured to process food involves the processing of mustard. Large vats allow the heavier components to settle downward, leaving the less dense, more fluid portion, at the surface. This same phenomenon is also often observed when dispensing this condiment on hot dogs: the runny stuff pours out first. Vat mixers typically utilize motor driven paddles, which are engineered such that a sufficient vortex must be created to pull the top layers down and homogenize the entire mixture. The major drawback is that the vat's entire contents must be vigorously stirred; no specific zones are targeted for mixing.

Greater homogeneity is facilitated by incorporating embodiments of the invention's fluid flow system during processing. Light fluid layers on top are pulled down, mixed in the passages, and release at targeted zones. In one embodiment, the only energy require for mixing is that used in compressing gas to be used in the system. Besides energy savings, cleaning, maintenance, and replacement cost savings could also be realized as there is not a requirement for moving parts to be placed in the fluid.

Emulsifier. One embodiment of a system configured in accordance with the invention facilitates mixing to the point of forming an emulsion.

Fermentation Facilitator. One embodiment of a system configured in accordance with the invention employs naturally occurring carbon dioxide that off-gasses as a result of fermentation to mix otherwise stratifying layers.

Gas Stripper. One embodiment of a system configured in accordance with the invention strips one gas from a liquid by injecting another gas for which the liquid has a greater affinity. This may be used, for example, to remove oxygen from water by injecting nitrogen Medical Gas Diffuser. One embodiment of a system configured in accordance with the invention strips oxygen out of blood by using nitrogen in a gas-lift conduit. In this embodiment no moving parts are placed within the gas-lift chamber and the removal of oxygen can occur without rupturing any blood cells by the movement of parts in the gas-lift chamber.

Mixing System. One embodiment of a system configured in accordance with the invention addresses mixing problems associated with stagnation in finished water storage tanks. Finished water storage tank reservoirs have issues with respect to deterioration of water quality. The most common problems are the loss of disinfectant residual resulting from poor mixing and circulation, hydraulic short-circuiting, poor turnover rate, and excessive pathogen detection time. Stagnation and dead spots lead to serious water quality issues such as the formation and proliferation of bacteria.

In one embodiment of the invention, the water intake and outtake conduits of the invention's fluid flow system are located in a finished water reservoir to flush out targeted dead spots and maintain a more uniform distribution of temperature, dissolved oxygen, and disinfectant residual. Part or all of the gas utilized in the gas-lift passage may be chlorine and/or some other disinfectant gas to restore disinfectant residuals to optimal levels.

Novelty/Aesthetics. One embodiment of a system configured in accordance with the invention creates a visually pleasing effect. This is accomplished through upward and downward flowing bubbles. This effect may be augmented with fluids that change color when gas in injected, lights, colored immiscible fluids, and the like.

In some embodiments of the invention, the collector conduit may comprise an inlet port at or near the same level as the gas release point in the gas-lift conduit. In other embodiments of the invention, the collector conduit may comprise holes in the side of the gas-lift conduit. In yet other embodiments of the invention, the collector conduit may draw fluid from a point (or points) distant to the gas-lift passage. Further, the outlet conduit can may be an outlet port at or near the gas/liquid separation point in the gas-lift conduit, holes in the side of the gas-lift conduit, or a conduit that passes the liquid to some point (or points) distant from the gas/liquid separation point. For more effective use, the collector and outlet conduits should not simultaneously be just a port at or near the gas release point in the gas-lift conduit. Similarly, both the collector and outlet conduits preferably should not simultaneously be located at or near the gas/liquid separation point or be just a port at or near the gas release point in the gas-lift conduit. Preferably, both conduits should not simultaneously exist as simple holes in the side of the gas-lift conduit. If the inlet for the collector conduit is near the gas release point in the gas-lift conduit, then preferably the down and out conduit should extend down below the liquid's surface in the gas-lift conduit. Similarly, if the outlet for the down and out conduit exits at or near the gas/liquid separation point in the gas-lift conduit, then preferably the collector conduit should extend above the gas emission point in the gas-lift conduit. The guidelines in this paragraph are not required to practice the invention but may be used to create a more effective system.

All of the U.S. patents, U.S. patent application publications, U.S. patent applications, foreign patents, foreign patent applications, and non-patent publications referred to in this document are incorporated herein by reference, in their entirety.

It should be recognized that the principles of moving fluid taught herein provide an extremely efficient transfer of energy. This results at least in part because gas is generally compressible while liquid is not. In embodiments of the invention, potential energy of the compressed gas may be almost completely converted into the potential energy of an elevated liquid. As each gas bubble emerges from the emitter at the bottom of the gas lift chamber, it displaces and elevates a volume of fluid equal to its volume. That volume is a function of the pressure on the bubble, at that height. However, as each bubble rises, the pressure on it diminishes and the volume of the bubble increases. In so doing, more and more fluid is displaced and elevated as the rising bubble's size increases. When a bubble reaches the top of a gas lift chamber, the pressure on it is roughly equal to the atmospheric pressure on the fluid's surface (or a vacuum in some embodiments). Most, of the energy required to pressurize the bubble has been transferred into the potential energy of the elevated water. A small fraction of the energy may be converted to the kinetic energy of the moving water. Energy loses occur mainly from friction between the two phases. In some embodiments of the invention, this application of transferring energy forms may approach the thermodynamic limit of efficiency From the foregoing it will be appreciated that, although specific embodiments of the invention have been described herein for purposes of illustration, various modifications may be made without deviating from the spirit and scope of the invention. Accordingly, the invention resides in the claims hereinafter appended.

What is claimed is:

1. An apparatus for directing fluid flow, comprising:
a collector conduit having a proximal and distal end, the proximal end having at least one opening to allow fluid to flow into the collector conduit;
a gas-lift conduit in fluid communication with the collector conduit;
a gas exit port located at an upper end of the gas-lift conduit;
a gas emitter arranged to emit gas into the gas-lift conduit; and
an outlet port in fluid communication with the gas-lift conduit, the outlet port providing an outlet for the fluid, wherein the apparatus is configured to allow flow in a first direction and reduce or prevent flow in second direction, the second direction being opposite to the first direction.

2. The apparatus of claim 1, wherein the apparatus is configured with a one way valve to allow flow in the first direction and reduce or prevent flow in the second direction.

3. The apparatus of claim 2, wherein the one way valve is inserted between the collector conduit and the gas-lift conduit.

4. The apparatus of claim 2, wherein the gas-lift conduit comprises an inlet coupled to the collector conduit, wherein the inlet is at a first elevation, the gas emitter is at a second elevation, and the gas emitter emits gas at a selected rate, wherein the apparatus is configured to allow flow in the first direction and reduce or prevent flow in the second direction via the first and second elevations and the selected rate.

5. The apparatus of claim 2, wherein the gas comprises ozone.

6. The apparatus of claim 5, wherein the apparatus is configured to receive ground water and decontaminate the ground water with the gas.

7. The apparatus of claim 2, wherein the gas comprises an agent that facilitates a change in the fluid.

8. The apparatus of claim 2, wherein the gas comprises chlorine.

9. The apparatus of claim 2, wherein the gas-lift conduit has an upper end and a lower end, and wherein the gas-lift conduit is contained in the collector conduit and the gas emitter is centered within the gas-lift conduit near the lower end.

10. The apparatus of claim 1, further comprising a down and out conduit positioned between the gas-lift conduit and the outlet port.

11. The apparatus of 10, wherein the outlet port is lower in elevation than the at least one opening of the collector conduit.

12. The apparatus of claim 1, wherein the outlet port is higher in elevation than the at least one opening of the collector conduit.

13. The apparatus of claim 1, further comprising a pump that pumps gas to the gas emitter, the pump having an inlet port and an outlet port.

14. The apparatus of claim 1, wherein the inlet port of the pump receives gas from the gas exit port and thereby creates a vacuum in the gas-lift conduit.

15. The apparatus of claim 14, wherein the gas from the gas exit port is decontaminated before being received by the inlet port of the pump.

16. The apparatus of claim 13, wherein the gas from the gas exit port is decontaminated and sent into the earth's atmosphere.

17. The apparatus of claim 13, further comprising a monitoring device configured to monitor a contamination of gas exiting through the gas exit port.

18. The apparatus of claim 17, further comprising a valve connected to the gas exit port, the valve controlling how much gas exits the gas exit port.

19. The apparatus of claim 18, wherein the valve is shut automatically when the contamination of gas exiting through the gas exit port is less than a selected threshold.

20. A method for creating a fluid flow path, comprising:
providing a first containment region fluidly connected to a second containment region, the first containment region having an inlet that receives a fluid from an environment surrounding the first containment region;
providing a one way mechanism in the fluid flow path, the one way mechanism allowing flow in one direction;
injecting pressurized gas into the second containment region, wherein the pressurized gas is injected near a lower end of the second containment region; and
providing a third containment region fluidly connected to the second containment region, wherein the third containment region includes an outlet.

21. The method of claim 20, wherein the one way mechanism comprises a one way valve inserted between the first containment region and the second containment region.

22. The method of claim 20, wherein the second containment region comprises a gas-lift conduit that has an upper end and a lower end, wherein the gas-lift conduit is contained in the first containment region and the pressurized gas is injected by an emitter that is centered within the gas-lift conduit near the lower end.

23. The method of claim 20, further comprising providing a set of one or more trenches coupled to the inlet and placing in each trench a perforated pipe.

24. The method of claim 20, further comprising providing a set of one or more trenches coupled to the outlet and placing in each trench a perforated pipe and placing a fluid-impermeable material over each trench.

25. An apparatus for directing fluid flow, comprising:
a collector conduit having a upper and a lower end, the upper end having, at a first elevation, an opening arranged to receive fluid from an environment surrounding the apparatus, the lower end having an opening arranged to transmit the fluid received from the environment;
a gas-lift conduit arranged to receive fluid from the collector conduit, the gas-lift conduit having a gas-emitter therein arranged to emit bubbles, wherein the gas-emitter is located at a second elevation that is lower than the first elevation; and
an outlet conduit, wherein the outlet conduit is arranged to receive the fluid or a portion thereof from the gas lift conduit and to conduct the fluid downward to return the fluid to the environment.

26. The apparatus of claim 25, wherein the apparatus is arranged to have the fluid received from the environment pass through the opening in the upper end of the collector conduit, down through the collector conduit, through the opening at the lower end into the gas-lift conduit, up through the gas-lift conduit, down through the outlet conduit, and into the environment in a continuous flow.

27. The apparatus of claim 26, wherein the continuous flow is maintained solely or primarily via the gas-emitter emitting the bubbles into the gas-lift conduit.

28. The apparatus of claim 25, wherein the bubbles are created with a gas that is entrained wit the fluid and decreases the density of the fluid in the gas-lift conduit.

29. The apparatus of claim 28, wherein the bubbles cause additional fluid to be drawn into the collector conduit.

30. The apparatus of claim 25, wherein the outlet conduit comprises an outlet port arranged to return the fluid to the environment, wherein the outlet port is lower in elevation than the opening in the upper end of the collector conduit.

31. The apparatus of claim 25, wherein the outlet conduit comprises an outlet port arranged to return the fluid to the environment, wherein the outlet port is lower in elevation than the opening in the lower end of the collector conduit.

32. The apparatus of claim 25, wherein the gas-lift conduit comprises an upper and a lower end and wherein the outlet conduit is arranged to receive the fluid from the upper end of the gas-lift conduit through an opening in the outlet conduit that is at an elevation above the opening in the upper end of the collector conduit.

33. A system for directing fluid flow, comprising:
a collector conduit having an upper and a lower end, the upper end comprising one or more openings arranged to receive ground water from an environment surrounding the collector conduit, the one or more openings arranged to extend above and below an anticipated ground water level when the collector conduit is inserted into the ground;
a gas-lift conduit having an opening at or near the lower end of the collector conduit and arranged to receive the ground water, the gas lift conduit having a gas-emitter therein arranged to emit bubbles to treat the ground water and cause the ground water within the gas-lift to rise, the gas-lift conduit having an upper and a lower end;
an outlet conduit having openings at or near the upper end of the gas-lift conduit and arranged to receive the groundwater from the gas-lift conduit, and to return the groundwater to the environment surrounding the system; and
a pump arranged to supply gas to the gas-emitter.

34. The system of claim 33, wherein the all of the moving parts in the system are contained in the pump.

35. The system of claim 33, wherein the ground water is treated underground.

36. The system of claim 33, wherein the upper end of the gas-lift conduit is open.

37. The system of claim 33, wherein the bubbles facilitate destruction of the hydrocarbons in the ground water.

* * * * *